United States Patent
Candelore et al.

(10) Patent No.: US 10,885,893 B2
(45) Date of Patent: Jan. 5, 2021

(54) TEXTUAL DISPLAY OF AURAL INFORMATION BROADCAST VIA FREQUENCY MODULATED SIGNALS

(71) Applicant: SONY CORPORATION, Tokyo (JP)

(72) Inventors: Brant Candelore, San Diego, CA (US); Mahyar Nejat, San Diego, CA (US); Peter Shintani, San Diego, CA (US); Robert Blanchard, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/433,453

(22) Filed: Jun. 6, 2019

(65) Prior Publication Data
US 2020/0388261 A1 Dec. 10, 2020

(51) Int. Cl.
*G10H 1/36* (2006.01)
*H04W 4/021* (2018.01)
*H04H 60/74* (2008.01)
*H04H 20/95* (2008.01)
*H04H 20/30* (2008.01)

(52) U.S. Cl.
CPC ............ *G10H 1/365* (2013.01); *G10H 1/368* (2013.01); *H04H 20/30* (2013.01); *H04H 20/95* (2013.01); *H04H 60/74* (2013.01); *H04W 4/021* (2013.01)

(58) Field of Classification Search
CPC combination set(s) only.
See application file for complete search history.

(56) References Cited

U.S. PATENT DOCUMENTS

| | | | |
|---|---|---|---|
| 5,659,368 A * | 8/1997 | Landis | H04N 7/035 348/467 |
| 6,061,056 A * | 5/2000 | Menard | H04N 5/4401 715/704 |
| 8,014,765 B2 | 9/2011 | Pettinato | |
| 8,635,645 B2 | 1/2014 | Krishnamoorthi et al. | |
| 2007/0273751 A1* | 11/2007 | Sachau | H04N 7/14 348/14.02 |
| 2008/0033610 A1* | 2/2008 | Engel | G07C 5/008 701/36 |

(Continued)

FOREIGN PATENT DOCUMENTS

| CN | 1684507 A | 10/2005 |
|---|---|---|
| CN | 106488264 A | 3/2017 |

*Primary Examiner* — El Hadji M Sall
(74) *Attorney, Agent, or Firm* — Chip Law Group

(57) ABSTRACT

An electronic device includes a display screen and circuitry. The circuitry receives a first frequency modulated (FM) signal from a first FM radio transmitter, via a first FM radio channel. The first FM signal comprises a broadcast data signal that includes an audio segment of aural information of a performer-of-interest at of a live event, text information associated with the audio segment, and synchronization information. The synchronization information is associated with the text information and the audio segment. The circuitry extracts the synchronization information from a plurality of data packets of the broadcast data signal. The circuitry extracts a portion of the text information from the extracted plurality of data packets of the broadcast data signal based on the extracted synchronization information. The circuitry controls display of the extracted portion of the text information on the display screen.

23 Claims, 10 Drawing Sheets

(56) References Cited

U.S. PATENT DOCUMENTS

| | | | | |
|---|---|---|---|---|
| 2010/0265398 A1* | 10/2010 | Johnson | ............... | H04N 21/435 |
| | | | | 348/500 |
| 2014/0142958 A1* | 5/2014 | Sharma | ................... | G10L 19/02 |
| | | | | 704/500 |
| 2014/0201645 A1* | 7/2014 | Mo | ..................... | G06F 16/9535 |
| | | | | 715/738 |

* cited by examiner

TEXTUAL DISPLAY OF AURAL INFORMATION BROADCAST VIA FREQUENCY MODULATED SIGNALS

CROSS-REFERENCE TO RELATED APPLICATIONS/INCORPORATION BY REFERENCE

None.

FIELD

Various embodiments of the disclosure relate to radio signal transmission and reception technology, audio-video, and display technologies. More specifically, various embodiments of the disclosure relate to textual display of aural information broadcast via frequency modulated (FM) signals.

BACKGROUND

Recent advancements in the field of audio-video technologies has led to increase in use of subtitles or closed captions for transcription of a dialogue or audio in movies or television programs. The subtitles may be transcription of a spoken dialogue or the phrase in a plurality of other languages to be understandable by a plurality of users. The closed captions includes subtitles for almost every sound (e.g., sound emitted by objects other than spoken dialogue of a human being and onomatopoeias). In conventional systems, the subtitles or closed captions may be generated for an audio portion of a portion of the video, beforehand, such that the subtitles are displayed along with the video. In such cases, subtitles or closed captions are embedded in the video along with position markers that indicate where the subtitle should appear and disappear in the video. In certain scenarios, where a spectator may be present at a live event, such as a live music concert or a live presentation, the spectator may be unaware of the phrases enunciated by an artist at the live event. In some other scenarios, the spectator may not understand the phrases enunciated by the artist at the live event due to a plurality of reasons, such as pronunciation of the phrases by the artist, noise from other human speakers, etc. In such cases, it may be difficult for the spectator to follow along with the artist during the live event.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and method for textual display of aural information broadcast via frequency modulated signals is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
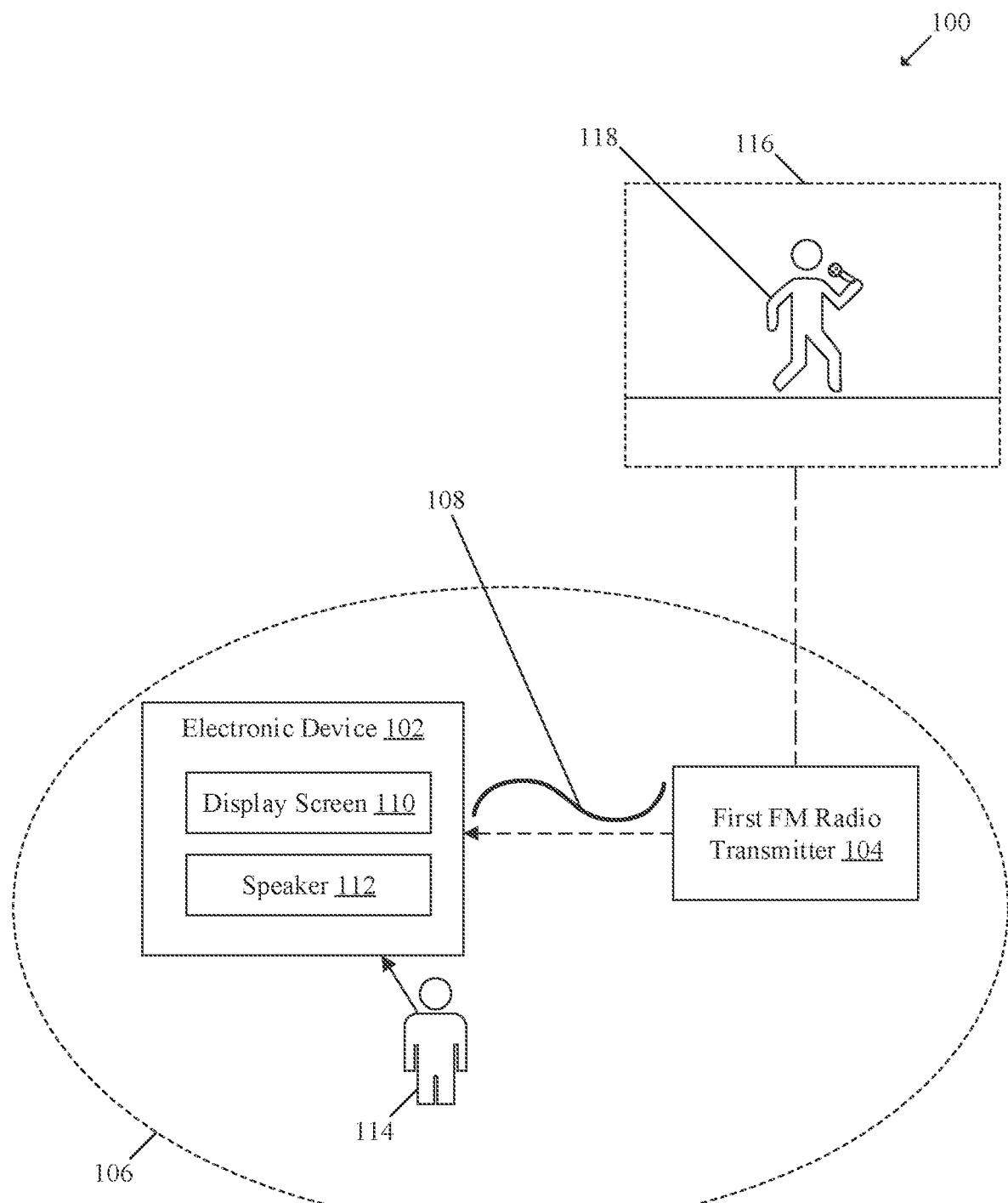
FIG. 1 is a block diagram that illustrates an exemplary network environment for textual display of aural information broadcast via frequency modulated (FM) signals, in accordance with an embodiment of the disclosure.

The following described implementations may be found in the disclosed apparatus and method for textual display of aural information broadcast via Frequency Modulated (FM) signals. Exemplary aspects of the disclosure provide an electronic device that may include a display screen. The electronic device may further include a circuitry coupled to the display screen, and the circuitry may be configured to receive a first FM signal from a first FM radio transmitter, via a first FM radio channel. The first FM signal may include a broadcast data signal that includes an audio segment of aural information of a performer-of-interest at a live event, text information associated with the audio segment, and synchronization information.

Traditionally, it is very difficult to understand the lyrics of a song sung in live venues, such as music halls, sports arenas, and the like. Many attendees (e.g., fans of a singer) often know the lyrics of hit songs, but not the less popular songs of musical artists. There are many reasons for the difficulty in understanding of the lyrics. For example, sound from musical instruments (with reverberation), the acoustics of the music hall, the volume/pitch of the voices, singers not enunciating correct phonetics, vowels and consonants stretched to match the melody, etc. Because the audience cannot actually understand the words of many songs, their enjoyment of the singing and overall concert is reduced. The disclosed apparatus and method for display of text information of vocal deliverances provides an enhanced user experience by significantly improving reception, extraction, and presentation of text information (lyrics information of a song and new words enunciated by an artist during a live concert. In contrast to conventional systems, the circuitry may be configured to extract a portion of the text information associated with the audio segment and the synchronization information, from a plurality of data packets of the broadcast data signal. The circuitry may be configured to control display of the extracted portion of the text information on the display screen, in accordance with the synchronization information. The synchronization information may be a timing information for the display of the portion of the text information on the display screen. Therefore, a user (i.e. spectator) of the electronic device may be able to view the portion of the text information associated with a portion of the audio segment on the display screen of the electronic device. The FM signal is received by the electronic device without using a cellular network by the electronic device. The electronic device may use a FM receiver to receive the first FM signal and extract the portion of the text information and the synchronization information from the broadcast data signal of the received FM signal. For example, during the live event, such as a live concert, the spectator, such as a member of an audience of a live concert, may view the portion of the text information for the portion for the audio segment of the aural information of the performer-of-interest, such as an artist or a singer, during the live concert. The display of the portion of the text information may be in synchronization with the enunciated portion of the audio segment, based on the extracted synchronization information. The portion of the text information may be a low-bit rate data that may utilize lesser data bits for transmission and reception as compared to videos. For example, the portion of the text information may utilize less than 100 bits per second. Therefore, it may be more efficient to transmit and receive the portion of the text information, via the first FM signal as compared to transmission through other communication networks, such as the cellular network.

FIG. 1 is a block diagram that illustrates an exemplary network environment for textual display of aural information broadcast via FM signals, in accordance with an embodiment of the disclosure. With reference to FIG. 1, there is shown a network environment 100. The network environment 100 may include an electronic device 102, a first FM radio transmitter 104, a display screen 110, and a speaker 112. The electronic device 102 may include the display screen 110 and the speaker 112. A user 114 (or spectator) may be associated with the electronic device 102. The electronic device 102 and the first FM radio transmitter 104 may be a part of a first environment 106 (e.g., a live concert in an open area). The electronic device 102 may receive a first FM signal 108 from the first FM radio transmitter 104. The network environment 100 may further include a performer-of-interest 118. The performer-of-interest 118 may be a part of a second environment 116 (e.g., a closed area near the first environment 106). The second environment 116 may be different from the first environment 106. In some embodiments, the second environment 116 may be same as the first environment 106.

The electronic device 102 may comprise suitable logic, circuitry, and interfaces that may be configured to receive the first FM signal 108 from the first FM radio transmitter 104. The first FM signal 108 may include a plurality of data packets. The electronic device 102 may be further configured to extract a portion of text information associated with a portion of an audio segment and synchronization information from the received first FM signal 108. The electronic device 102 may be configured to control display of the extracted portion of the text information on the display screen 110. Examples of the electronic device 102 may include, but are not limited to, a smart phone, a wearable smart-glass device, a head-mounted device, a computing device, a conferencing device, a mainframe machine, a server, a computer work-station, or a consumer electronic (CE) device.

The first FM radio transmitter 104 may comprise suitable logic, circuitry, and interfaces that may be configured to broadcast a first FM signal 108. The first FM radio transmitter 104 may be implemented by use of several technologies that are well known to those skilled in the art.

The display screen 110 may comprise suitable logic, circuitry, and interfaces that may be configured to display the portion of the text information for the portion of the audio segment extracted from the broadcast data signal of the received first FM signal 108. In some embodiments, the display screen 110 may be a touch screen, which may enable the user 114 to provide input via the display screen 110. The touch screen may be at least one of a resistive touch screen, a capacitive touch screen, or a thermal touch screen. In some embodiments, the display screen 110 may be an external display screen associated with the electronic device 102. The display screen 110 may be realized through several known technologies such as, but not limited to, at least one of a Liquid Crystal Display (LCD) display, a Light Emitting Diode (LED) display, a plasma display, or an Organic LED (OLED) display technology, or other display screens. In accordance with an embodiment, the display screen 110 may refer to, but not limited to, a display screen of a smart-glass device, a see-through display, a projection-based display, an electro-chromic display, or a transparent display. The speaker 112 may comprise suitable logic, circuitry, and interfaces that may be configured to output the extracted portion of the audio segment that may be extracted from the plurality of data packets of the first FM signal 108. In some embodiments, the speaker 112 may be an external speaker that may be associated with the electronic device 102. Examples of the speaker 112 may include, but are not limited to, a headphone, a speaker of a smartphone, or in-ear headphones.

The user 114 (for example a spectator) may be a part of an audience in a live event, such as a live concert, a live conference, and the like. The user 114 may provide an input to the electronic device 102. The user 114 may utilize an input device, such as a touch screen, a microphone, and the like, to provide an input to the electronic device 102.

The performer-of-interest 118 may refer to a human artist who may be associated with an audio capturing device in a live event. For example, the performer-of-interest 118 may be a singer in a live concert and may be associated with the audio capturing device, such as a microphone, in the live concert. In another example, the performer-of-interest 118 may be a presenter in a live presentation and may be associated with a microphone while presenting during the live presentation.

In operation, the first environment 106 may include the electronic device 102 and the first FM radio transmitter 104. The first environment 106 may be a closed environment or an open environment. Examples of the first environment 106 may include, but are not limited to, a live concert in an open area, a closed auditorium, and the like. The electronic device 102 may be present in the first environment 106. The electronic device 102 may be configured to receive the first FM signal 108 from the first FM radio transmitter 104, via a first FM radio channel. The first FM radio transmitter 104 may be configured to generate the first FM signal 108 based on frequency modulation of a carrier wave and a baseband data signal. The first FM radio transmitter 104 may encode information on the carrier wave based on variation in an instantaneous frequency of the carrier wave. The first FM signal 108 may be in the FM frequency band that may be in a range defined by specific standards and rules of a specific geographical region. For example, a frequency band that extends from 87.8 Megahertz (MHz) to 108 MHz may be used in United Stated of America by the electronic device 102, as disclosed herein.

The first FM signal 108 may include a broadcast data signal that may include a plurality of data packets. The broadcast data signal may include an audio segment of aural information of a performer-of-interest, such as the performer-of-interest 118, at the live event, such as the second environment 116. The live event may be an event that may be happening in real-time. For example, the aural information of the performer-of-interest 118 may be a song sung by a singer in a live concert. The broadcast data signal may further include the text information associated with the audio segment, and the synchronization information. The second environment 116 may be a closed environment or an open environment, which may be the same as, or different from, the first environment 106. In some embodiments, the second environment 116 may be different from the first environment 106. For example, the second environment 116 may an open environment of a live concert that includes the performer-of-interest 118 as a performer or a singer at the live concert. The performer-of-interest 118 may be the singer and may be associated with an audio capturing device, such as a microphone, that may be utilized to capture the audio segment of the aural information of the performer-of-interest 118. The audio segment of the live event may correspond to audio content, such as a song performed by the performer-of-interest 118 (such as a singer) at the live concert. The text information associated with the audio segment may be lyrics information for the audio segment (e.g. a song). The synchronization information may be associated with the text information and the audio segment. The synchronization information may correspond to timing information associated with the audio segment. The synchronization information may indicate a time for appearance and disappearance of the text information associated with the audio segment on the display screen 110. For example, the synchronization information may indicate when the lyrics information associated with the song appears and disappears on a display screen, such as the display screen 110, such that the displayed lyrics information is synchronized with the song.

In accordance with an embodiment, the electronic device 102 may be configured to receive a first plurality of FM signals from a plurality of FM radio transmitters, which includes the first FM radio transmitter 104. The first plurality of FM signals may be received via a plurality of FM radio channels from the plurality of FM radio transmitters. Each FM signal of the first plurality of FM radio signals may include a location signal that includes information associated with a geo-location of each FM radio transmitter of the plurality of FM radio transmitters. The geo-location may correspond to geographical location. For example, the first FM signal 108 may include the location signal that includes information associated with the geo-location of the first FM radio transmitter 104. In some embodiments, the broadcast data signal in each FM signal of the first plurality of FM signals may include the location signal. The electronic device 102 may be further configured to select the first FM radio channel from the plurality of FM radio channels, based on the location signal of each FM signal of the first plurality of FM signals. For example, the electronic device 102 may select the first FM radio channel, based on the location signal of the first FM signal 108 of the first plurality of FM signals. A geo-location of the electronic device 102 may match with the location signal of the first FM signal 108 of the first plurality of FM signals for selection of the first FM radio channel. For example, at a live concert, the location signal of the first FM signal 108 may match with the geo-location of the electronic device 102, as the electronic device 102 may be at a same location as that of the first FM radio transmitter 104.

In accordance with another embodiment, each FM signal of the first plurality of FM signals may further include an event identifier. In some embodiments, the broadcast data signal in each FM signal of the first plurality of FM signals may include the event identifier. The event identifier in each FM signal of the first plurality of FM signals may correspond to identification information of an event from a plurality of events. For example, the event identifier of the first FM signal 108 corresponds to the identification information of the live event. Examples of the identification information may include, but are not limited to, a title of the live event, an identification number of the live event, a name of the performer-of-interest 118 (e.g., the singer) at the live event, and the like. The electronic device 102 may be further configured to select the first FM radio channel from the plurality of FM radio channels, based on the event identifier of each FM signal of the first plurality of FM signals.

The electronic device 102 may be configured to select the first FM radio channel based on the event identifier of the first FM signal 108 of the first plurality of FM signals. The electronic device 102 may be configured to store a default event identifier that may match with the event identifier of the first FM signal 108 for selection of the first FM radio channel. In some embodiments, the default event identifier may be based on a user-input. In some embodiments, each FM signal of the first plurality of FM signals may include the location signal and the event identifier together. In such scenarios, the electronic device 102 may be configured to select the first FM radio channel to receive the first FM signal 108 from the first FM radio transmitter 104, based on the location signal and the event identifier of the first FM signal 108.

In accordance with another embodiment, the electronic device 102 may be configured to receive, via the first FM radio channel, a second plurality of FM signals from the plurality of FM radio transmitters. The plurality of FM radio transmitters may include the first FM radio transmitter 104. Alternatively stated, the electronic device 102 may be configured to receive the second plurality of FM signals from the plurality of FM radio transmitters via the first FM radio channel, based on the time-division multiplexing of the second plurality of FM signals. Each FM signal of the second plurality of FM signals may further include the location signal that may include information associated with a geo-location of corresponding each FM radio transmitter of the plurality of FM radio transmitters. For example, the first FM signal may include the location signal associated with the geo-location of the first FM radio transmitter 104. In some embodiments, the broadcast data signal of each FM signal of the second plurality of FM signals may include the location signal. The electronic device 102 may be configured to filter a plurality of unwanted FM signals from the received second plurality of FM signals to obtain the first FM signal 108.

The electronic device 102 may be configured to filter the unwanted FM signals from the second plurality of FM signals, based on a comparison of a geo-location of the electronic device 102 with the geo-location of each FM radio transmitter of the plurality of FM radio transmitters. The plurality of unwanted FM signals may correspond to the FM signals of the second plurality of FM signals that may include the location signal that may be different from the geo-location of the electronic device 102. Alternatively stated, the geo-location of the plurality of FM radio transmitters of the plurality of unwanted FM signals may be different from the geo-location of the electronic device 102. The electronic device 102 may be configured to obtain the first FM signal 108 from the first FM radio transmitter, based on filtration of the plurality of unwanted FM signals from the second plurality of FM signals. For example, the electronic device 102 may be configured to filter the plurality of FM signals that are received from the FM radio transmitter that is at a different geo-location from the electronic device 102.

In accordance with another embodiment, each FM signal of the second plurality of FM signals may further include the event identifier. In some embodiments, the broadcast data signal of each FM signal of the second plurality of FM signals may include the event identifier. The electronic device 102 may be further configured to filter the plurality of unwanted FM signals from the second plurality of FM signals to obtain the first FM signal 108. The electronic device 102 may be configured to filter the plurality of unwanted FM signals to obtain the first FM signal 108 based on a comparison of the event identifier of each FM signal of the second plurality of FM signals with a user-specified event identifier. For example, the plurality of unwanted FM signals may be received from other events that may be happening in the vicinity of the user 114 but may not be associated with the event (e.g., the live concert) desired by the user 114. The user-specified identifier may be receiver from a user, such as the user 114, based on a selection of event by the user. For example, the user 114 may select a name of a performer-of-interest (e.g., a singer) at the event, such as the performer-of-interest 118 at the live event, which may correspond to the user-specified identifier. In some embodiments, each FM signal of the second plurality of FM signals may include the location signal and the event identifier together. In such scenarios, the electronic device 102 may be configured to filter the plurality of unwanted FM signals to obtain the first FM signal 108 from the first FM radio transmitter 104, based on the location signal and the event identifier of the first FM signal 108. For example, the electronic device 102 may filter the plurality of unwanted FM signals based on location signal of the live event in the first FM signal 108 and the event identifier, such as, name of the event in the first FM signal 108.

In accordance with an embodiment, the electronic device 102 may be configured to receive the first FM signal 108 from the first FM radio transmitter 104 via the first FM radio channel. The first FM signal 108 may include the broadcast data signal. The broadcast data signal may further include an audio segment of aural information of a performer-of-interest at of a live event, text information associated with the audio segment, and synchronization information. The electronic device 102 may be further configured to extract a plurality of data packets from the broadcast data signal of the first FM signal 108. The electronic device 102 may be further configured to extract the synchronization information from the extracted plurality of data packets of the broadcast data signal. The electronic device 102 may be further configured to extract a portion of the text information from the extracted plurality of data packets of the broadcast data signal. The portion of the text information may be extracted based on the extracted synchronization information from the broadcast data signal. The synchronization information may correspond to timing information associated with the audio segment. The electronic device 102 may be further configured to control display of the extracted portion of the text information on a display screen, such as the display screen 110. The extracted portion of the text information may be displayed based on the timing information.

In accordance with an embodiment, the electronic device 102 may be further configured to extract a portion of the audio segment from the extracted plurality of data packets of the broadcast data signal. For example, the portion of the audio segment may be a small audio portion of a song that may be played during a live concert. The extracted portion of the text information may be the text information (e.g., lyrics information) associated with the portion of the audio segment (e.g., a portion of the song). The electronic device 102 may be further configured to control the speaker 112 to output the extracted portion of the audio segment. The display of the extracted portion of the text information on the display screen 110 may be synchronized with the portion of the audio segment, based on the extracted synchronization information. For example, the user 114 present in a live concert, may be associated with the electronic device 102 that receives the first FM signal from the first FM radio transmitter 104 present at the live concert. The user 114 (e.g., a person or spectator who is a part of the audience) may be able to read the portion of the text information (e.g., portion of lyrics information) associated with the portion of the audio segment (e.g., portion of a song) of the aural information of the performer-of-interest 118 (e.g., a singer at the live concert) on the display screen 110. The user 114 may further listen to playback of the portion of the audio segment (e.g., portion of the song), via the speaker 112, and read the portion of the text information on the display screen 110, such that the displayed portion of text information is synchronized with the playback of the portion of the audio segment.

In accordance with an embodiment, the electronic device 102 may be configured to determine a first display characteristic of the portion of the text information that may be displayed on the display screen 110. The first display characteristic may be determined based on at least one of a size of the display screen, an aspect ratio of the display screen, or a total number of characters in the portion of the text information. The first display characteristic of the portion of the text information may be a combination of a first plurality of display parameters. The first plurality of display parameters may include a font size, a font style, and a number of characters in the portion of the text information to be displayed on the display screen 110. For example, the first display characteristic of the portion of the text information may be determined based on the aspect ratio of the display screen 110. Therefore, the first display characteristic may indicate the font style, the font size or the number of characters in the portion of the text information that may be displayed on the display screen 110 so that the user 114 may be able to clearly view the portion of the text information on the display screen 110.

In accordance with an embodiment, the electronic device 102 may be configured to determine a second display characteristic of the portion of the text information, based on a background color of the display screen 110. The second display characteristic of the portion of the text information may be a combination of a second plurality of display parameters. The second plurality of display parameters may include a font color, a brightness value, a contrast value, and a sharpness value of the portion of the text information displayed on the display screen 110. For example, the font color of the portion of the text information displayed on the display screen 110 may be based on the background color of the display screen 110 so that the user 114 may be able to clearly view the portion of the text information on the display screen 110.

Figure 2:
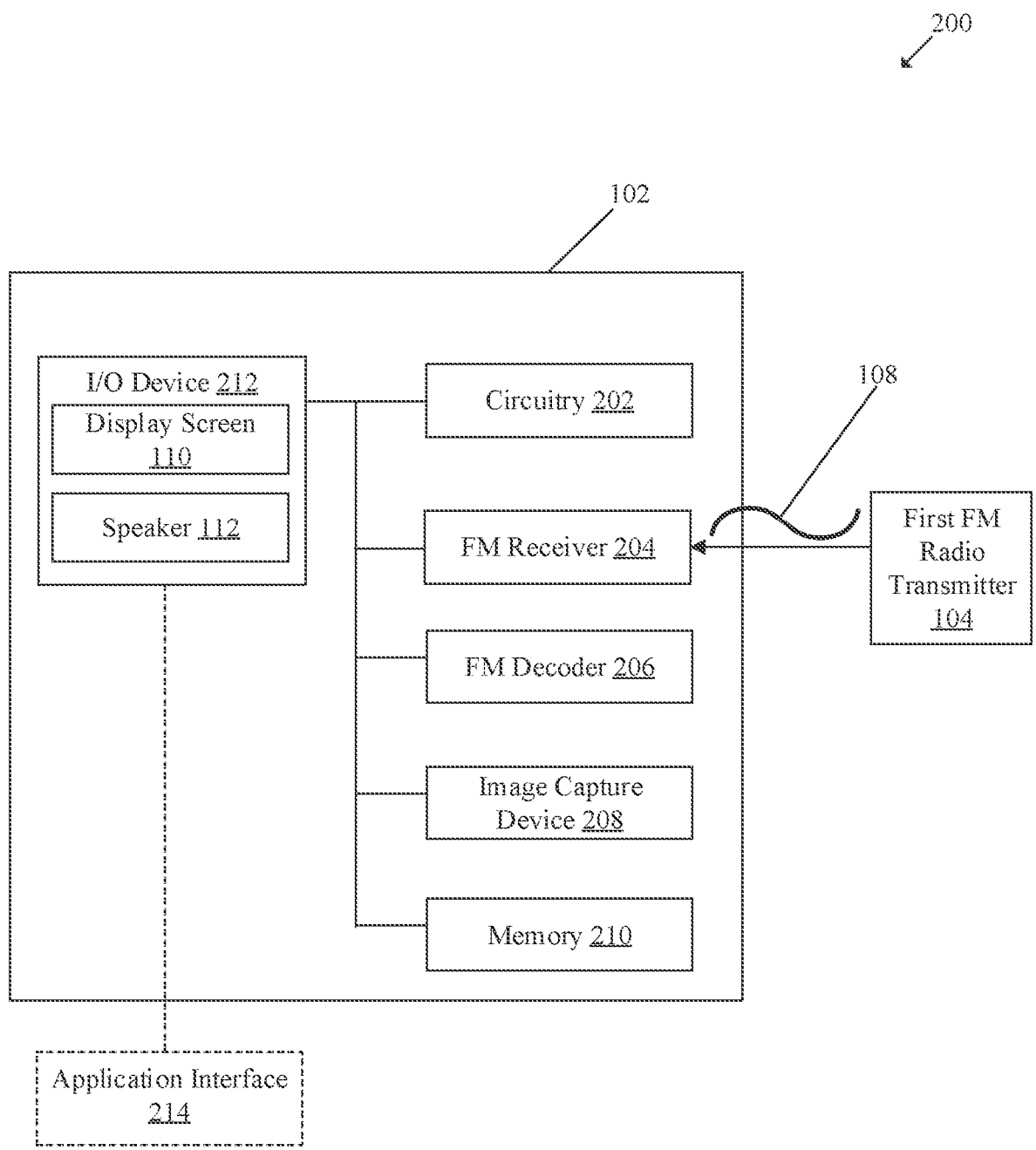
FIG. 2 is a block diagram that illustrates an exemplary electronic device for textual display of aural information broadcast via FM signals, in accordance with an embodiment of the disclosure.

FIG. 2 is a block diagram that illustrates an exemplary electronic device for textual display of aural information broadcast via FM signals, in accordance with an embodiment of the disclosure. FIG. 2 is explained in conjunction with elements from FIG. 1. With reference to FIG. 2, there is shown the electronic device 102. The HMD may include circuitry 202, a FM receiver 204, a FM decoder 206, an image capture device 208, a memory 210, and an input/output (I/O) device 212. The I/O device 212 may include the display screen 110 and the speaker 112. The display screen 110 may be utilized to render an application interface 214. The circuitry 202 may be communicatively coupled to the FM receiver 204, the FM decoder 206, the memory 210, and the I/O device 212.

The circuitry 202 may comprise suitable logic, circuit, and interfaces that may be configured to extract the plurality of data packets from the received first FM signal 108. The circuitry 202 may be further configured to extract the synchronization information and the portion of the text information associated with the portion of the audio segment from the extracted plurality of data packets. The circuitry 202 may be implemented based on a number of processor technologies known in the art. Examples of the processor technologies may be a Graphical Processing Unit (GPU), a Central Processing Unit (CPU), x86-based processor, a Reduced Instruction Set Computing (RISC) processor, an Application-Specific Integrated Circuit (ASIC) processor, a Complex Instruction Set Computing (CISC) processor, other processors, and the like.

The FM receiver 204 may comprise suitable logic, circuit, and interfaces that may be configured to receive a plurality of FM signals from a plurality of FM radio transmitters. The FM receiver 204 may be configured to receive the plurality of FM signals via a plurality of FM radio channels. The FM receiver 204 may be implemented by use of several technologies that are well known to those skilled in the art.

The FM decoder 206 may comprise suitable logic, circuit, and interfaces that may be configured to decode the broadcast data signal from the received first FM signal 108. The FM decoder 206 may be further configured to extract the plurality of data packets of the broadcast data signal. The FM decoder 206 may be implemented by use of several technologies, such as Data Radio Channel (DARC) or Radio Data System (RDS), that are well known to those skilled in the art.

The image capture device 208 may comprise suitable logic, circuit, and interfaces that may be configured to capture a plurality of images or video of a scene of a live event in a line-of-sight (LOS) of the user 114. Examples of the image capture device 208 may include, but are not limited to, a camera, an image sensor, a color sensor (such as a red-green-blue (RGB) sensor), and the like.

The memory 210 may comprise suitable logic, circuitry, and interfaces that may be configured to store the text information associated with the audio segment. The memory 210 may be further configured store the synchronization information extracted from the broadcast data signal. Examples of implementation of the memory 210 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 212 may comprise suitable logic, circuitry, and interfaces that may be configured to receive an input from a user, such as the user 114, and provide an output to the user 114, based on the received input from the user 114. The I/O device 212 may include various input and output devices, which may be configured to communicate with the circuitry 202. Examples of the I/O device 212 may include, but are not limited to, a touch screen, a keyboard, a mouse, a joystick, a microphone, a display screen (for example, the display screen 110), and a speaker (for example, the speaker 112).

The application interface 214 may correspond to a user interface (UI) rendered on a display screen, such as the display screen 110. The application interface 214 may display the portion of the text information on the display screen 110. An example of the application interface 214 may include, but is not limited to, a graphical user interface (GUI).

Figure 3A:
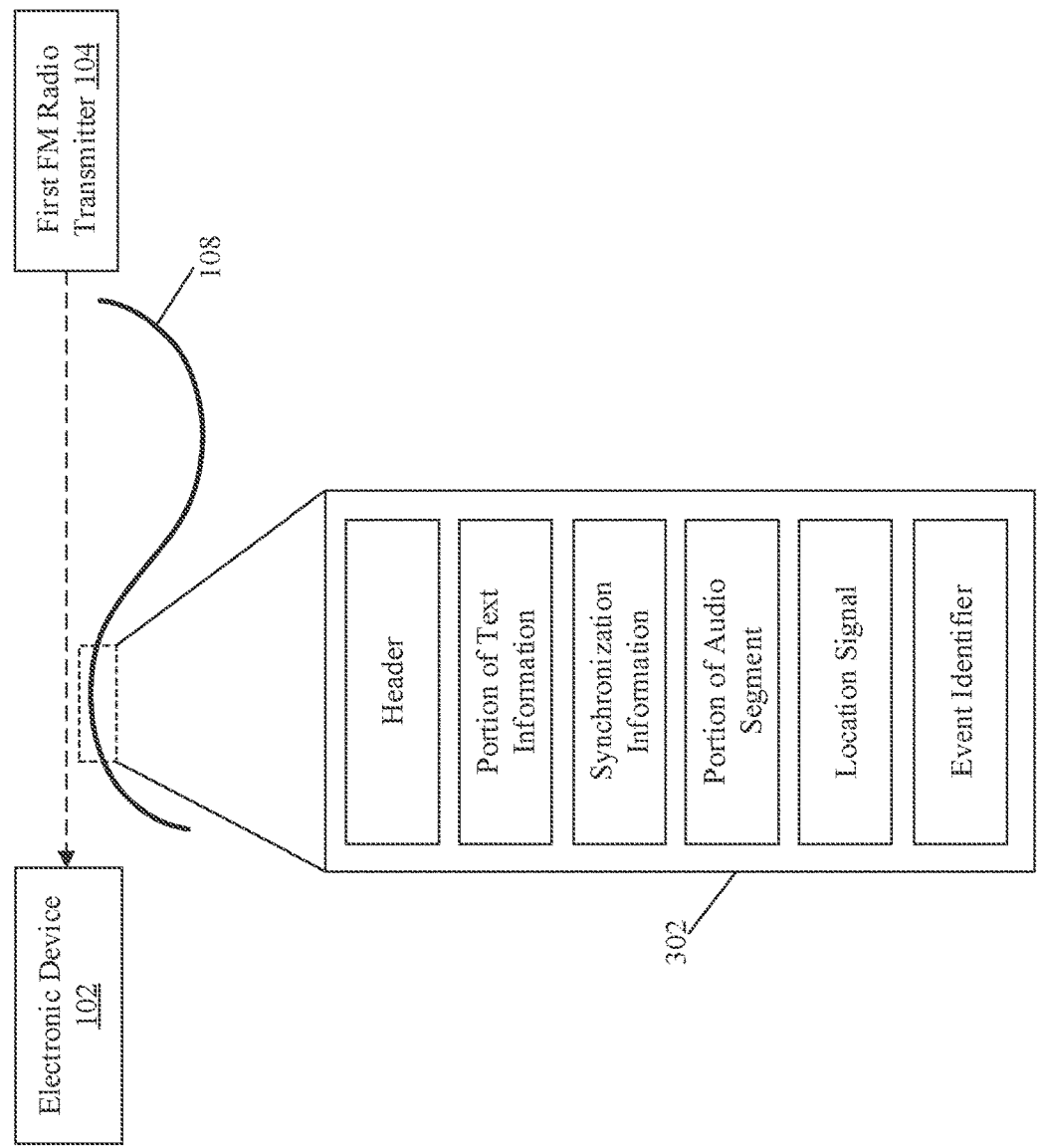
FIG. 3A illustrates an exemplary scenario of broadcast of an FM signal to an exemplary electronic device from a FM radio transmitter, in accordance with and embodiment of the disclosure.

FIG. 3A illustrates an exemplary scenario of broadcast of an FM signal to an exemplary electronic device from a FM radio transmitter, in accordance with an embodiment of the disclosure. FIG. 3A is explained in conjunction with elements from FIG. 1 and FIG. 2. With reference to FIG. 3A, there is shown the electronic device 102, the first FM radio transmitter 104, the first FM signal 108, and a broadcast data signal 302. In accordance with an embodiment, electronic device 102 may be further configured to receive the first FM signal 108 from the first FM radio transmitter 104, via the first FM radio channel. In accordance with an embodiment, the electronic device 102 may include the FM receiver 204 configured to receive the first FM signal 108. The FM receiver 204 may further utilize a plurality of filters to extract the first FM signal 108 received via the first FM radio channel. The FM receiver 204 may be configured to demodulate the received first FM signal 108 based on removal of the carrier wave from the first FM signal 108.

The FM decoder 206 may be configured to decode the received first FM signal 108. The first FM signal 108 may include the broadcast data signal 302. The FM decoder 206 may be further configured to extract the plurality of data packets from the broadcast data signal 302. In some embodiments, the FM decoder 206 may be integrated with the circuitry 202. The broadcast data signal 302 may include, but not limited to, a header, a portion of the text information, the synchronization information, a portion of the audio segment, a location signal, and an event identifier. The FM decoder 206 may be configured to decode the broadcast data signal 302 from the received first FM signal 108.

The header of the broadcast data signal 302 may be a block of data in the plurality of packets of the broadcast data signal 302. The header may be supplemental data that may be placed at a beginning of the plurality of data packets of the broadcast data signal 302. For example, the header may include information about the length of the broadcast data signal 302, or an identification information of the first FM radio transmitter 104. The broadcast data signal 302 may further include portion of the audio segment of the live event, such as a live concert, by the performer-of-interest 118. For example, the audio segment may correspond to a song that the performer-of-interest 118 may sing during the live event and the portion of the audio segment may be a portion of the song. The broadcast data signal 302 may further include the portion of the text information that may be associated with the portion of the audio segment (e.g., portion of the song). For example, the text information may include lyrics information of the song that the performer-of-interest 118 may sing during the live event and the portion of the text information may be a part of the lyrics information of the portion of the audio segment (e.g., portion of the song).

The broadcast data signal 302 may further include the synchronization information. The synchronization information may be the timing information for the display of the portion of the text information on the display screen 110. The timing information may correspond to a time for appearance and disappearance of the portion of the text information on the display screen 110. The circuitry 202 may be configured to control the display of the extracted portion of the text information on the display screen 110 such that the displayed portion of the text information may be synchronized with playback of the corresponding portion of the audio segment from the speaker 112, based on the synchronization information. The display of the extracted portion of the text information may be further synchronized with the aural information of the portion of the audio segment during the live event by the performer-of-interest 118 (e.g., the singer in the live concert). For example, the user 114 may view the portion of the text information (e.g., portion of lyrics information) associated with the portion of the audio segment (e.g., portion of the song) on the display screen 110 during the live concert when the performer-of-interest 118 (e.g., a singer) may be singing the portion of the audio segment in the live concert.

In accordance with an embodiment, the broadcast data signal 302 may further include the location signal that includes information associated with the geo-location of the first FM radio transmitter 104. In some embodiments, when the first FM radio transmitter may be at the live event, the location signal of the broadcast data signal 302 may include information associated with the geo-location of the live event. For example, if the live event is at a first location in a surrounding of the electronic device 102 and the first FM radio transmitter 104 is located at the first location of the live event, the location signal may include the information associated with the first location of the live event. The broadcast data signal 302 may further include the event identifier. The event identifier may include the identification information of the live event. For example, the event identifier may include information of the title of the live event, the identification number of the live event, name of the performer-of-interest 118 at the live event, and the like. The event identifier for each of a plurality of live events may be different from each other based on the identification information of each of the plurality of live events. In some embodiments, the broadcast data signal 302 may include other information that may be different from the audio segment of the aural information of the performer-of-interest 118, the text information associated with the audio segment, the synchronization information, the location signal, and the event identifier. The arrangement of the information in the broadcast data signal 302, such as, the audio segment of the aural information of the performer-of-interest 118, the text information associated with the audio segment, the synchronization information, the location signal, and the event identifier may or may not be predefined.

Figure 3B:
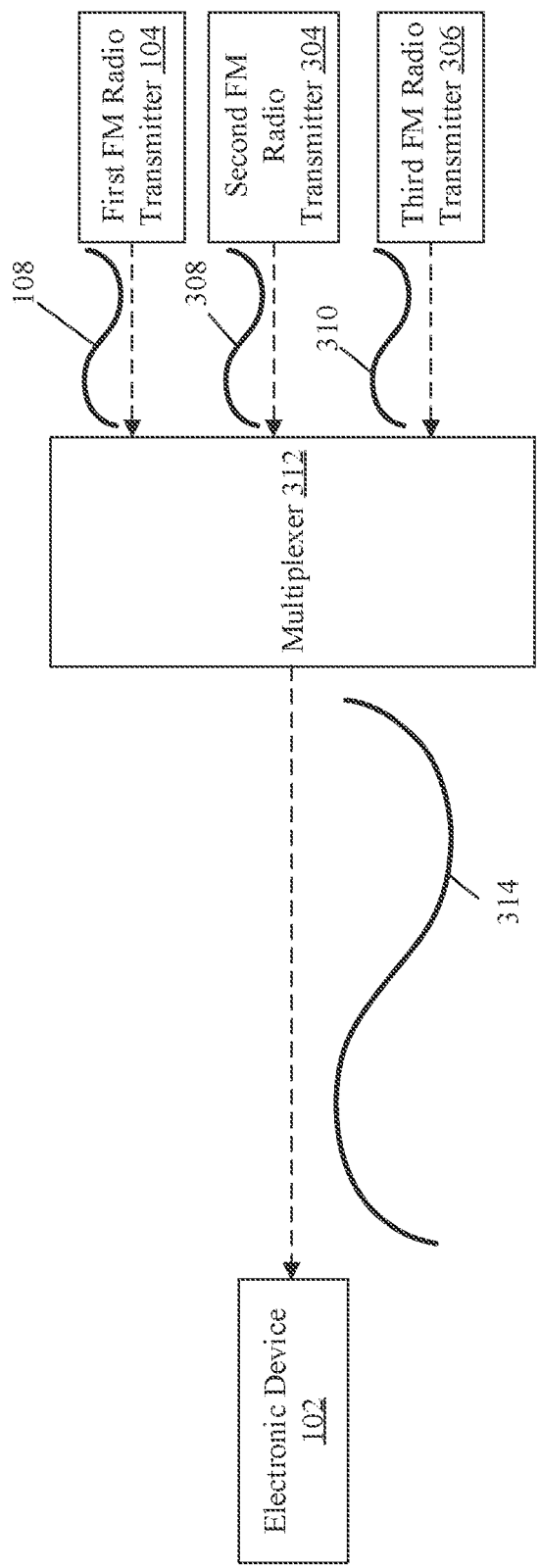
FIG. 3B illustrates an exemplary scenario of broadcast of a plurality of FM signals to an exemplary electronic device from a plurality of FM radio transmitters, in accordance with an embodiment of the disclosure.

FIG. 3B illustrates an exemplary scenario of broadcast of a plurality of FM signals to an exemplary electronic device from a plurality of FM radio transmitters, in accordance with an embodiment of the disclosure. FIG. 3B is explained in conjunction with elements from FIG. 1, FIG. 2, and FIG. 3A. With reference to FIG. 3B, there is shown the electronic device 102, the first FM radio transmitter 104, the first FM signal 108, a second FM radio transmitter 304, a third FM radio transmitter 306, a second FM signal 308, a third FM signal 310, a multiplexer 312, and a multiplexed FM signal 314. In accordance with an embodiment, the electronic device 102 may be configured to receive, via the first FM radio channel, the second plurality of FM signals from the plurality of FM radio transmitters, such as the first FM radio transmitter 104, the second FM radio transmitter 304, and the third FM radio transmitter 306.

The electronic device 102 may be configured to receive the multiplexed FM signal 314 that includes the first FM signal 108, the second FM signal 308, and the third FM signal 310, based on the time-division multiplexing of the first FM signal 108, the second FM signal 308, and the third FM signal 310. The electronic device 102 may receive the multiplexed FM signal 314 via the first FM radio channel. The multiplexer 312 may be configured to select and transmit the first FM signal 108 during a first time slot, the second FM signal 308 during a second time slot, and the third FM signal 310 during a third time slot of a time domain. The first time slot, the second time slot, and the third time slot may be of fixed time period in the time domain. The first FM signal 108, the second FM signal 308, and the third FM signal 310 may include information that may be different from each other. For example, the first FM signal 108 includes the portion of the audio segment of the aural information of the performer-of-interest 118 at the live event, the portion of the text information (e.g., lyrics information) for the portion of the audio segment, the location signal, the event identifier, and the synchronization information associated with the live event. Similarly, for example, the second FM signal 308 may include an audio segment of a pre-recorded music, and the third FM signal 310 may include text information associated with a conference that may be occurring in the surrounding of the electronic device 102. The first FM signal 108 may be the FM signal received by the electronic device 102 that may be desired by the user 114 (e.g., user of the electronic device 102 who is a part of the audience at a live concert), as the first FM signal includes the portion of the audio segment of aural information of the performer-of-interest 118 (e.g., a singer at a live concert) at the live event. The second FM signal 308 and the third FM signal 310 may be a plurality of unwanted FM signals of the second plurality of FM signals.

In accordance with an embodiment, the circuitry 202 may be configured to filter the second FM signal 308 and the third FM signal 310 from the multiplexed FM signal 314 to obtain the first FM signal 108, based on a comparison of the location signal of the first FM signal 108, the second FM signal 308, and the third FM signal 310 with the geo-location of the electronic device 102. In accordance with another embodiment, the circuitry 202 may be configured to filter the second FM signal 308 and the third FM signal 310 from the multiplexed FM signal 314 to obtain the first FM signal 108, based on a comparison of the event identifier of the first FM signal 108, the second FM signal 308, and the third FM signal 310 with the user-specified event identifier. In accordance with another embodiment, the circuitry 202 may be configured to filter the second FM signal 308 and the third FM signal 310 from the multiplexed FM signal 314 to obtain the first FM signal 108, based on the comparison of the location signal and the event identifier of the first FM signal 108, the second FM signal 308, and the third FM signal 310 with the geo-location of the electronic device 102 and the user-specified event identifier. In some embodiments, the second FM signal 308 and the third FM signal 310 may not include the location signal and the event identifier. In such cases, the circuitry 202 may be configured to filter the second FM signal 308 and the third FM signal 310 from the multiplexed FM signal 314 to obtain the first FM signal 108, based on the absence of the location signal and the event identifier in the second FM signal 308 and the third FM signal 310. For example, if the received FM signal, such as the second FM signal 308 and the third FM signal 310 may not include the location signal and the event identifier, then the circuitry 202 may be configured to filter the second FM signal 308 and the third FM signal 310 due to the absence of any of the location signal and the event identifier in the second FM signal 308 and the third FM signal 310.

Figure 4:
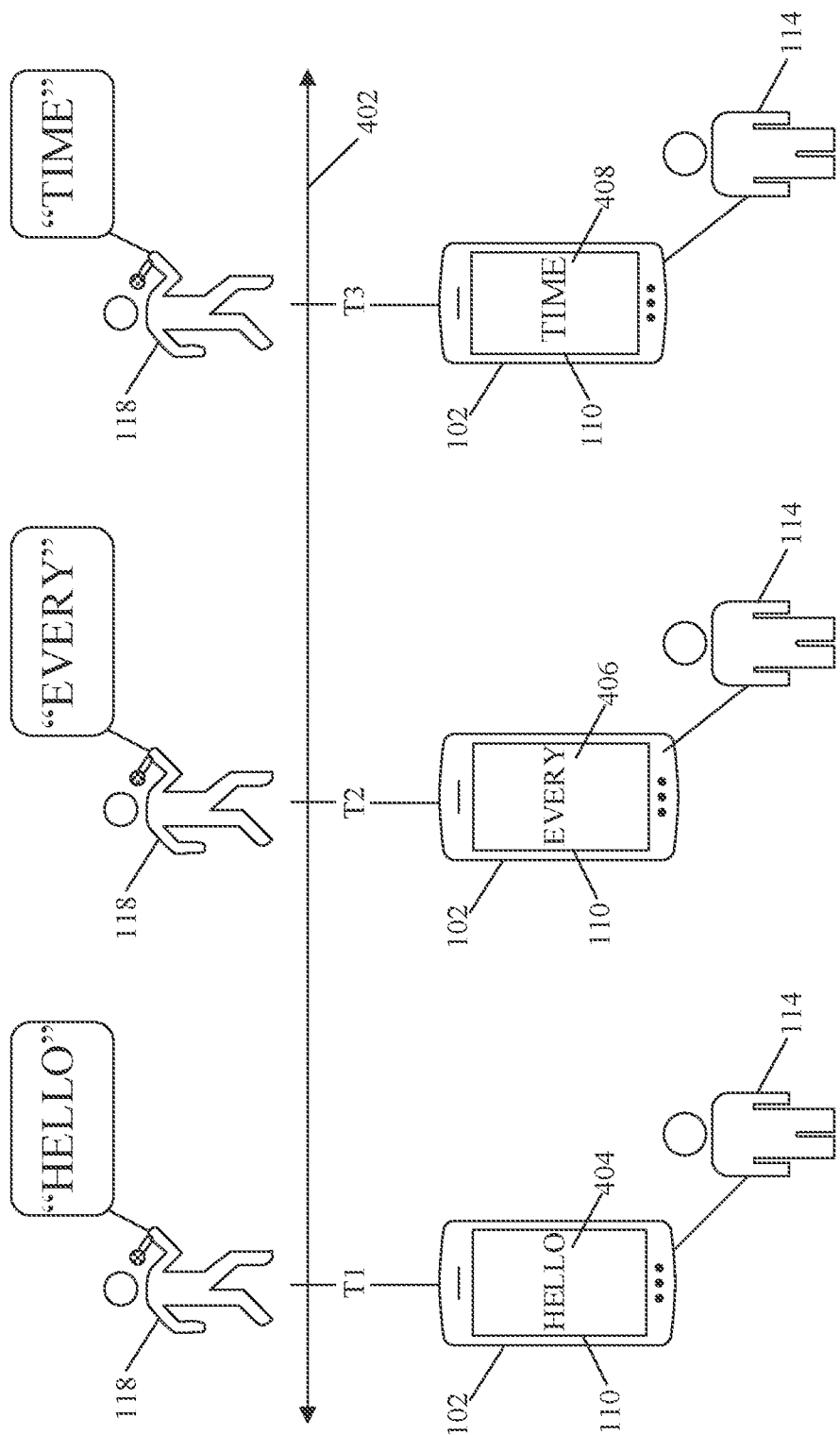
FIG. 4 illustrates an exemplary scenario of a timeline that indicates a display of a portion of the text information associated with a portion of an audio segment, in accordance with an embodiment of the disclosure.

FIG. 4 illustrates exemplary scenario of a timeline that indicates a display of a portion of the text information associated with a portion of an audio segment of a aural information of a performer-of-interest, in accordance with an embodiment of the disclosure. FIG. 4 is explained in conjunction with elements from FIGS. 1, 2, 3A and 3B. With reference to FIG. 4, there is shown a timeline 402, the electronic device 102, the display screen 110, the user 114, the performer-of-interest 118, a first portion of the text information 404, a second portion of the text information 406, and a third portion of the text information 408. The timeline 402 may indicate a plurality of time instances during a live event, such as a live concert performed by the performer-of-interest 118. In accordance with an embodiment, the performer-of-interest 118 may enunciate a first portion of the audio segment at a first time instance (also represented as "T1") during the live event. For example, a singer of a live concert may sing a first portion of a song (or some words not part of original lyrics of the song) at the first time instance during the live concert. The electronic device 102 may be configured to receive a FM signal, such as the first FM signal 108 that may include the first portion of the audio segment, the first portion of the text information 404, and the synchronization information. The first portion of the text information 404 may be the lyrics information associated with the first portion of the audio segment.

The FM decoder 206 may be configured to extract the first portion of the audio segment and the first portion of the text information from the plurality of data packets of the first FM signal 108. The circuitry 202 may be configured to control the display of the first portion of the text information 404 on the display screen 110 at the first time instance (also represented as "T1") during the live event or with some lag. For example, the first portion of the audio segment of the aural information of the performer-of-interest 118 may be a word "Hello" at the first instance (also represented as "T1") during the live event. Therefore, the user 114 associated with the electronic device 102 may view the first portion of the text information 404 associated with the portion of the audio segment of the aural information of the performer-of-interest 118 that is "Hello" on the display screen 110 in real-time or near real-time. The display of the first portion of the text information 404 on the display screen 110 may be in synchronization with the first portion of the audio segment that is enunciated by the performer-of-interest 118 at the first time instance (also represented as "T1").

In accordance with an embodiment, the performer-of-interest 118 may further enunciate a second portion of the audio segment at a second time instance (also represented as "T2") during the live event. For example, the singer of a live concert may sing a second portion of the song at the second time instance during the live concert. The second portion of the text information 406 may be the lyrics information associated with the second portion of the audio segment of the aural information of the performer-of-interest 118. The circuitry 202 may be configured to control the display of the second portion of the text information 406 on the display screen 110 at the second time instance (also represented as "T2") during the live event or with some lag. For example, the second portion of the audio segment may be a word "Every" enunciated by the performer-of-interest 118 (e.g., a singer) at the second time instance during the live event. Therefore, the circuitry 202 may be configured to control the display of the second portion of the text information 406 associated with the second portion of the audio segment of the aural information of the performer-of-interest 118 that is "Every" on the display screen 110. The user 114 associated with the electronic device 102 may view the second portion of the text information 406 that is "Every" on the display screen 110 at the second time instance (also represented as "T2") when the performer-of-interest 118 enunciates the phrase "Every" in real-time or near real-time.

Similarly, the performer-of-interest 118 may further enunciate a third portion of the audio segment at a third time instance (also represented as "T3") during the live event. For example, a singer of the live concert may sing a third portion of the song at the third time instance during the live concert. The third portion of the text information 408 may be the part of the lyrics information (or not a part of the lyrics information) associated with the third portion of the audio segment of the aural information of the performer-of-interest 118. The circuitry 202 may be configured to control the display of the third portion of the text information 408 on the display screen 110 at the third time instance (also represented as "T3") during the live event or with some lag. For example, the third portion of the audio segment may be a word "Time" enunciated by the performer-of-interest 118 (e.g., a singer) at the third time instance during the live event. Therefore, the circuitry 202 may be configured to control the display of the third portion of the text information 408 associated with the third portion of the audio segment of the aural information of the performer-of-interest 118 that may be "Time" on the display screen 110. The user 114 associated with the electronic device 102 may view the third portion of the text information 408 that may be "Time", on the display screen 110 at the third time instance (also represented as "T3") when the performer-of-interest 118 enunciates the word "Time" in real-time or near real-time. The circuitry 202 may be configured to display the portion of the text information associated with the portion of the audio segment (for example, portion of a song) on the display screen 110 in real-time or near real-time in accordance with the aural information of the portion of the audio segment in the live event. As the portion of text information (for example, lyrics information of a song), are already known and received from the first FM radio transmitter 104, thus accurate conversion in real time or near real time is achieved. At the same time, if a word or a phrase that do not form part of known lyrics of a song, then it is not only readily converted from audio to text, but also placed at correct position and order in the displayed text as enunciated by the performer-of-interest 118. The user 114 may be able to view the portion of the text information on the display screen 110 and concurrently hear the aural information of the portion of the audio segment by the performer-of-interest 118 (e.g., the singer) during the live event.

Figure 5:
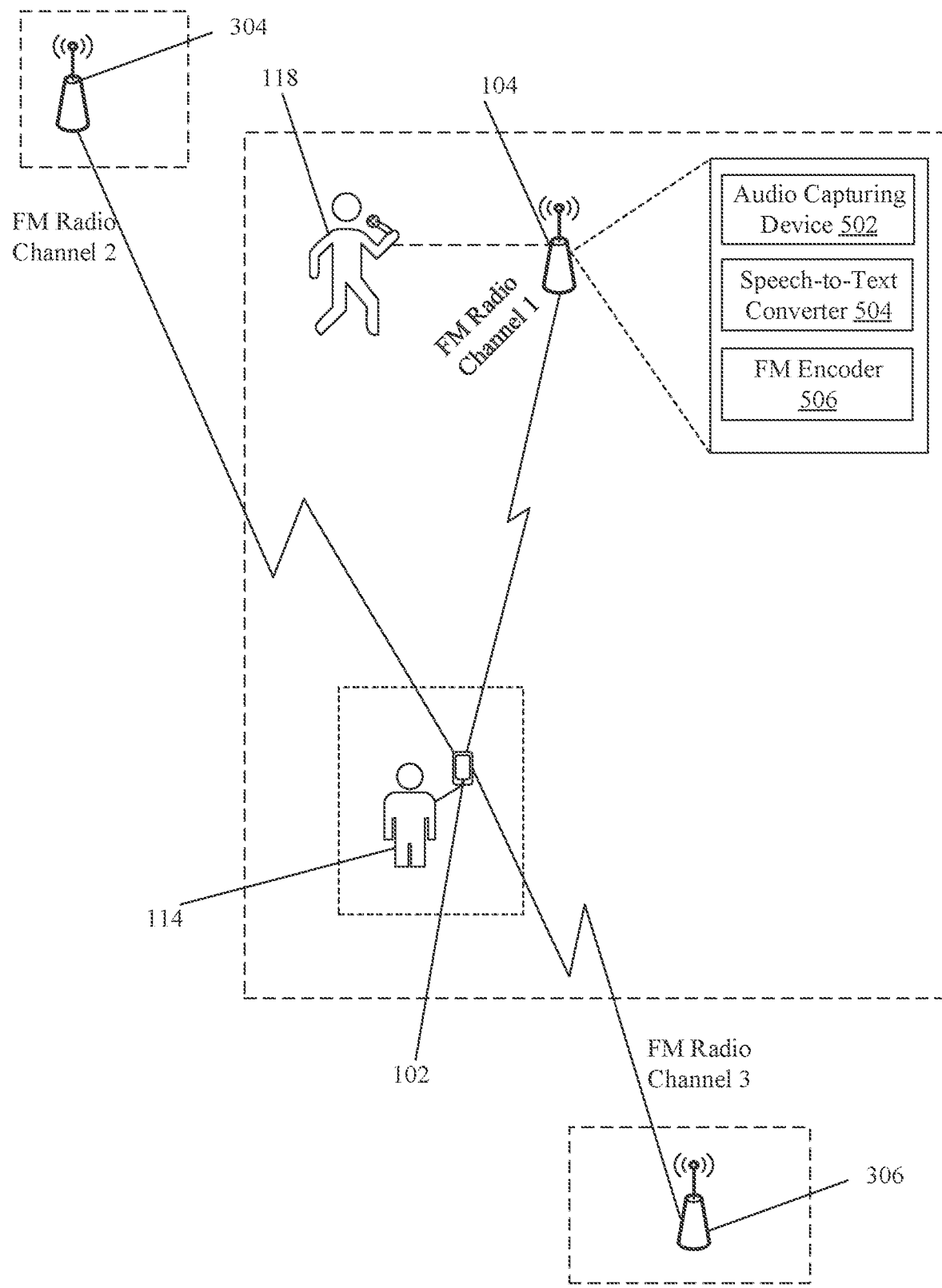
FIG. 5 illustrates an exemplary scenario of broadcast of a plurality of FM signals to an exemplary electronic device from a plurality of FM radio transmitters via a plurality of FM radio channels, in accordance with an embodiment of the disclosure.

FIG. 5 illustrates an exemplary scenario of broadcast of a plurality of FM signals to an exemplary electronic device from a plurality of FM radio transmitters via a plurality of FM radio channels, in accordance with an embodiment of the disclosure. FIG. 5 is explained in conjunction with elements from FIGS. 1, 2, 3A, 3B and 4. With reference to FIG. 5, there is shown the electronic device 102, the first FM radio transmitter 104, the user 114 (i.e., the listener or spectator in audience), the performer-of-interest 118 (i.e., the singer), the second FM radio transmitter 304, the third FM radio transmitter 306, an audio capturing device 502, a speech-to-text converter 504 and an FM encoder 506. With reference to FIG. 5, there is further shown the first FM signal 108, the second FM signal 308, and the third FM signal 310.

In accordance with an embodiment, the first FM radio transmitter 104 may be located at a first geo-location. The second FM radio transmitter 304 may be located at a second geo-location and the third FM radio transmitter 306 may be located at a third geo-location. The performer-of-interest 118, such as a singer, may perform at the live event at the first geo-location. The audio capturing device 502 may be configured to capture the audio segment, such as a song, that may be sung by the performer-of-interest 118. The speech-to-text converter 504 may be configured generate the text information associated with the audio segment, based on conversion of the captured audio segment to text. In some embodiments, the text information associated with the audio segment may be stored in a memory (not shown) in the first FM radio transmitter 104.

In accordance with an embodiment, the FM encoder 506 may be configured to encode the captured audio segment, the text information associated with the audio segment, and the synchronization information in a carrier wave by modulating the frequency of the carrier wave to generate the first FM signal 108. The FM encoder 506 may be further configured to encode the location signal associated with the geo-location of the first FM radio transmitter 104 and the event identifier in the carrier wave to generate the first FM signal 108. In accordance with an embodiment, the audio capturing device 502, the speech-to-text converter 504, and the FM encoder may be associated with the first FM radio transmitter 104. In some embodiments, the audio capturing device 502, the speech-to-text converter 504, and the FM encoder may be integrated with the first FM radio transmitter 104.

In accordance with an embodiment, the user 114 may be an attendant of the live event and may be associated with the electronic device 102. The electronic device 102 may be configured to receive the first plurality of FM signals from the plurality of FM radio transmitters, via the plurality of FM radio channels. The plurality of FM radio transmitters may include the first FM radio transmitter 104, the second FM radio transmitter 304, and the third FM radio transmitter 306. The electronic device 102 may be configured to receive the first FM signal 108 from the first FM radio transmitter 104, via the first FM radio channel (also represented as "FM radio channel 1"). The electronic device 102 may be configured to receive the second FM signal 308 from the second FM radio transmitter 304 via a second FM radio channel (also represented as "FM radio channel 2"). The electronic device 102 may be further configured to receive the third FM signal 310 from the third FM radio transmitter 306 via a third FM radio channel (also represented as "FM radio channel 3"). The geo-location of the electronic device 102 may be same as the geo-location of the first FM radio transmitter 104.

In accordance with an embodiment, the circuitry 202 may be configured to select the first FM radio channel based on the location signal in the first FM signal 108 or the event identifier in the first FM signal 108. The second FM signal 308 received from the second FM radio transmitter 304 and the third FM signal 310 received from the third FM radio transmitter 306 may include the location signal and the event identifier. In some embodiments, the second FM signal 308 and the third FM signal 310 may not include the location signal and the event identifier. The circuitry 202 may be configured to detect a presence of the location signal and the event identifier in each FM signal of the first plurality of FM signals. For example, the circuitry 202 may be configured to detect a presence of the location signal and the event identifier in the first FM signal 108, the second FM signal 308, and the third FM signal 310.

The circuitry 202 may be further configured to select the first FM radio channel based on a comparison of the location signal of the first FM signal 108, the second FM signal 308 and the third FM signal 310 with the geo-location of the electronic device 102. In some embodiments, the circuitry 202 may be configured to select the first FM radio channel based on a comparison of the event identifier of the first FM signal 108, the second FM signal 308, and the third FM signal 310 with the default event identifier that may be stored in the memory 210. For example, the second FM signal 308 received via the second FM radio channel and the third FM signal 310 received via the third FM radio channel may be received from events that may be different from the live event at which the user 114 may be present. Therefore, in such cases, the circuitry 202 may be configured to select the first FM radio channel based on the event identifier of the first FM signal 108 that may correspond to the identification information of the live event at which the user 114 (or spectator) is present. In some other embodiments, the circuitry 202 may be configured to select the first FM radio channel, based on both, the location signal and the event identifier of the first FM signal 108, the second FM signal 308, and the third FM signal 310.

Figure 6A:
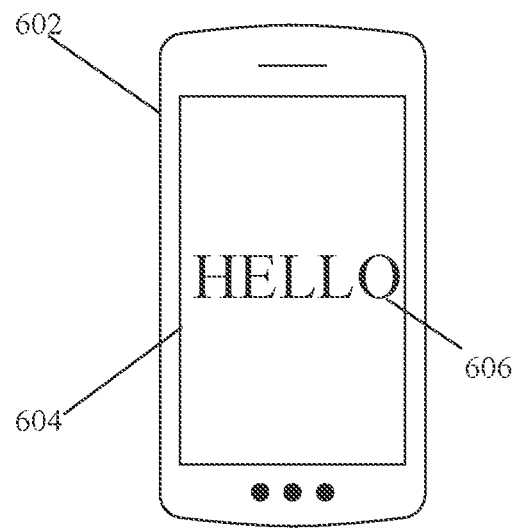
FIG. 6A illustrates a first scenario that depicts presentation of text information associated with an audio segment of aural information of a performer-of-interest on the display screen of an exemplary electronic device, in accordance with an embodiment of the disclosure.

FIG. 6A illustrates a first scenario that depicts presentation of text information associated with an audio segment of aural information of a performer-of-interest on the display screen of an exemplary electronic device, in accordance with an embodiment of the disclosure. FIG. 6A is explained in conjunction with elements from FIGS. 1, 2, 3A, 3B, 4 and 5. With reference to FIG. 6A, there is shown a smartphone 602, a display screen 604 of the smartphone 602, and a first text 606. In accordance with an embodiment, the smartphone 602 may correspond to the electronic device 102 and the display screen 604 of the smartphone 602 may correspond to the display screen 110 of the electronic device 102. The first text 606 may correspond to the portion of the text information. In accordance with an embodiment, the circuitry 202 may be configured to determine the first display characteristic of the first text 606. The first display characteristic of the first text 606 may be determined based on a size of the display screen 604, an aspect ratio of the display screen 604, or a total number of characters in the first text 606.

The first display characteristic of the first text 606 may be a combination of a plurality of display parameters, such as a font size, a font style, and a number of characters in the first text 606 to be displayed on the display screen 604. For example, the circuitry 202 may be configured to display a single word of the first text 606, such as "Hello" on the display screen 604, based on the size of the display screen 604 and the aspect ratio of the display screen 604. For another example, if the total number of characters in the first text 606 may be is less than a specified count (e.g., "10") then, all the characters of the first text 606 may be displayed in a single line. Further, the circuitry 202 may be configured to determine the font size of the first text 606 based on the total number of characters in the first text 606. For example, if the total number of characters in the first text 606 may be equal to or more than the specified count (e.g. "10") then, the font size of the first text 606 may be determined such that the first text 606 fits on the display screen 604 and is clearly visible to a user, such as the user 114 (e.g., a user in the audience of the live event). Alternatively stated, the display of text information on the display screen 604 depends not only the number of characters in a word or phrase currently enunciated by a singer, but also on the recipient device display capabilities, size of display screen 604, and user-preferences for display characteristics, such as font size, background, and the like.

Figure 6B:
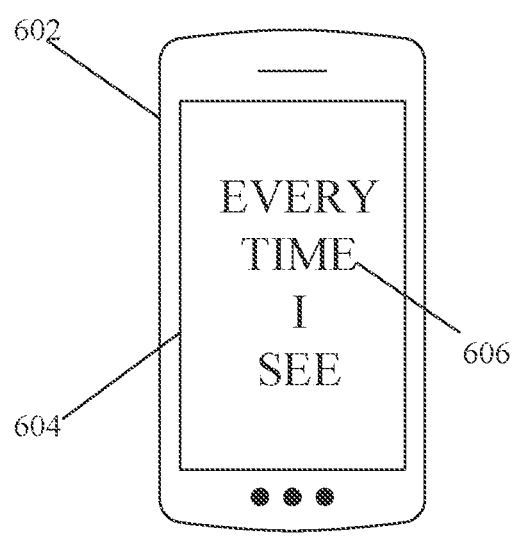
FIG. 6B illustrates a second scenario that depicts presentation of text information associated with an audio segment of aural information of a performer-of-interest on the display screen of an exemplary electronic device, in accordance with an embodiment of the disclosure.

FIG. 6B illustrates a second scenario that depicts presentation of text information associated with an audio segment of aural information of a performer-of-interest on the display screen of an exemplary electronic device, in accordance with an embodiment of the disclosure. With reference to FIG. 6B, there is shown the smartphone 602, the display screen 604 of the smartphone 602, and the second text 608. In accordance with an embodiment, the circuitry 202 may be configured to determine the first display characteristic of the second text 608 based on the total number of characters of the second text 608. For example, the total number of characters of the second text 608 may be greater than the specified count (i.e., "13" characters detected in this case) Therefore, the circuitry 202 may be configured to determine the font size of the second text 608 based on the total number of characters of the second text 608. For example, the font size of the second text 608, such as "Every Time I See" may be determined based on the total number of characters of the second text 608. Further, the circuitry 202 may be configured to display the second text 608 in a paragraph that comprises a plurality of lines, based on the total number of characters of the second text 608. In some embodiments, the circuitry 202 may be configured to display some characters of second text 608 on the display screen 604 at a time.

In accordance with embodiment, the circuitry 202 may be configured to determine the second display characteristic of second text 608, based on a background color of the display screen 604. The second display characteristic may be a combination of the second plurality of display parameters, such as a font color, a brightness value, a contrast value, or a sharpness value of the second text 608 displayed on display screen 604. For example, if the background color of the display screen is "Black", the circuitry 202 may be configured to determine the font color of the second text 608 as "White", such as the second text 608 is clearly visible to the user 114 and the font color of the second text 608 is distinguishable from the background color of the display screen 604.

Figure 7A:
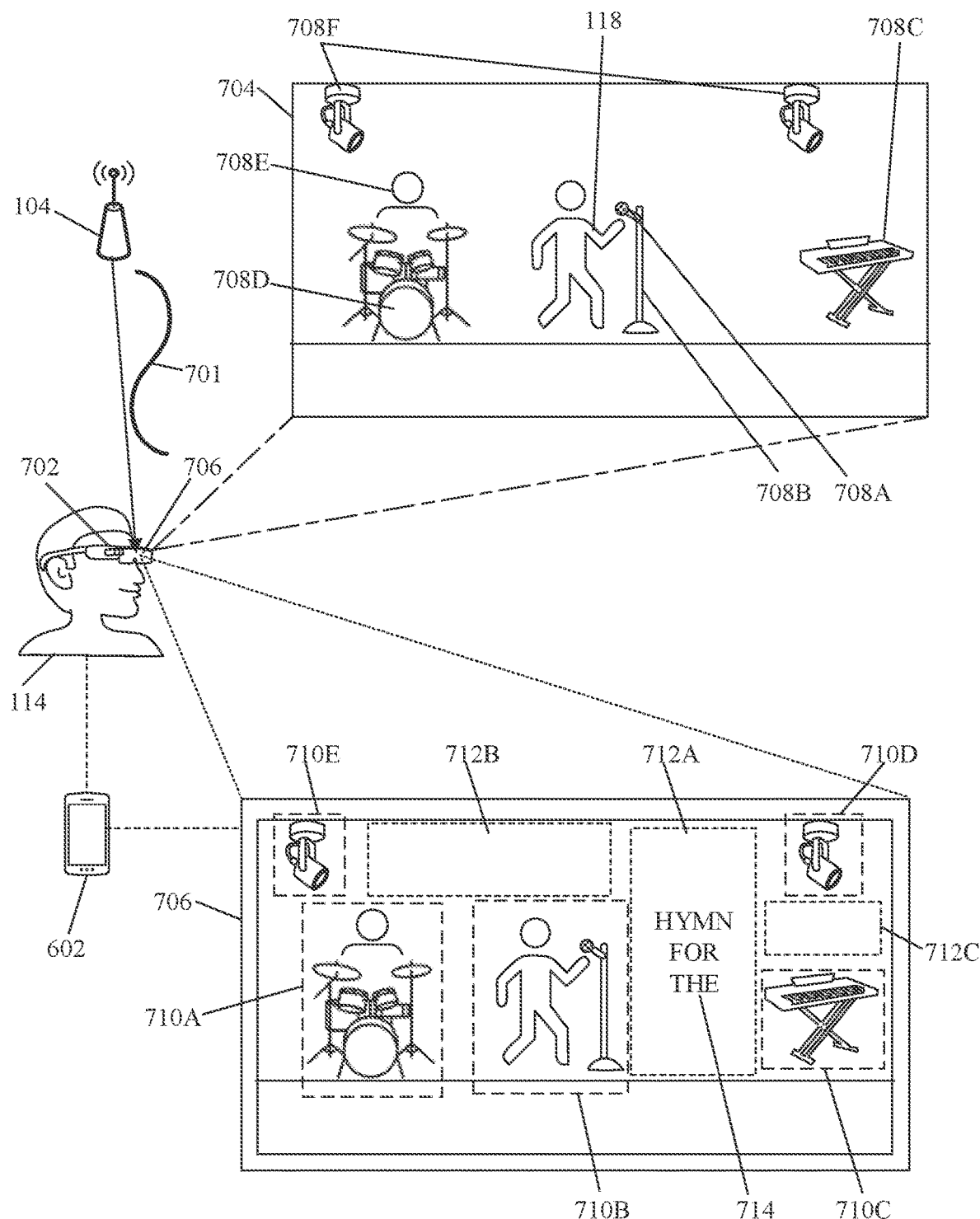
FIGS. 7A and 7B, collectively, illustrate a scenario that depicts presentation of text information associated with an audio segment of aural information of a performer-of-interest on a display screen of an electronic device at a live event, in accordance with an embodiment of the disclosure.
Figure 7B:
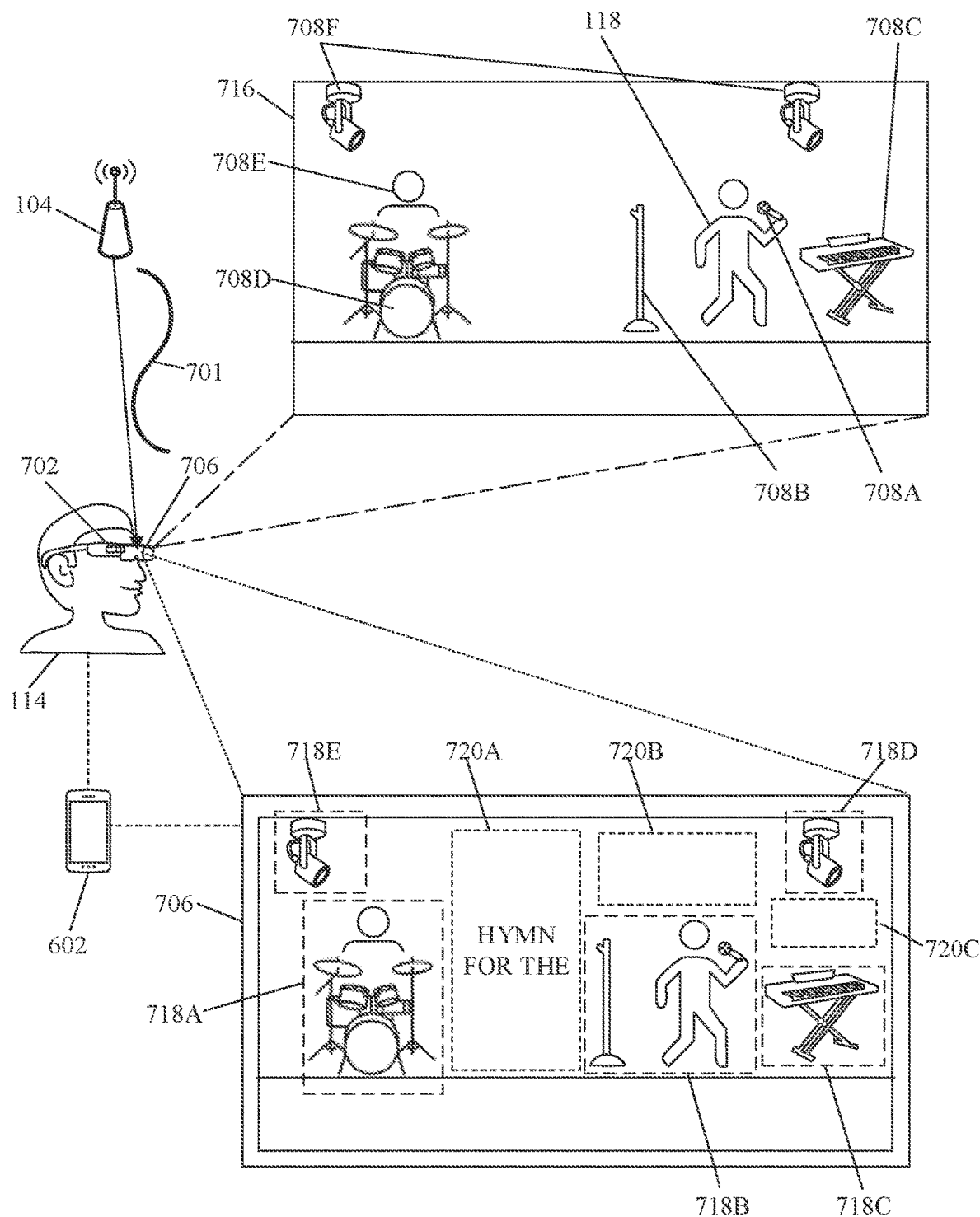

FIGS. 7A and 7B, collectively, illustrate a scenario that depicts presentation of text information associated with an audio segment of aural information of a performer-of-interest on a display screen of an electronic device at a live event, in accordance with an embodiment of the disclosure. FIG. 7A is explained in conjunction with elements from FIGS. 1, 2, 3A, 3B, 4, 5, 6A and 6B. With reference to FIG. 7A, there is shown an electronic device, such as a head-mounted device 702 or the smartphone 602. There is also shown a first scene 704, a display screen 706 of the head-mounted device 702, the user 114 (or spectator), the performer-of-interest 118, a plurality of objects 708A to 708F, a first plurality of visually relevant areas 710A to 710E, a first plurality of visually non-relevant areas 712A to 712C and a first text 714.

In accordance with an embodiment, the head-mounted device 702 may correspond to the electronic device 102 and the display screen 706 of the head-mounted device 702 may correspond to the display screen 110 of the electronic device 102 (FIG. 1). In the scenario of FIG. 7A, the display screen 706 of the head-mounted device 702 may be a see-through display screen or a smart-glass. The first scene 704 may be a scene of a live event, such as a live concert. The first scene 704 may include the plurality of objects 708A to 708F present at the live concert, such as the performer-of-interest 118 (for example, a singer at a live concert), a microphone 708A, a microphone stand 708B, a piano 708C, a drum 708D, a drummer 708E, a plurality of lights 708F, and the like. The user 114 (or spectator) may be a part of the audience of the live event, such as the live concert. The head-mounted device 702 may be a wearable device that may worn by the user 114 during the live concert. The user 114 may wear the head-mounted device 702 while viewing a live concert. In some embodiments, the head-mounted device 702 may not be required and instead of the head-mounted device 702, the user 114 may hold and point the smartphone 602 towards the first scene 704 to capture a view of the first scene 704. Thus, the operations described for the head-mounted device 702 in FIGS. 7A and 7B may also be processed in the smartphone 602.

The head-mounted device 702 may include an image capture device, such as the image capture device 208 of the electronic device 102. The image capture device 208 may be configured to capture an image of the first scene 704 in a line-of-sight (LOS) of the user 114. The captured image of the first scene 704 may include the plurality of objects 708A to 708F. The position of the plurality of objects 708A to 708F may vary in the captured image/video based on movement of the performer-of-interest 118 and one or more of the plurality of objects 708A to 708F during the live event. The head-mounted device 702 may include the circuitry 202.

The circuitry 202 of the head-mounted device 702 may be further configured to receive an FM signal 701 from the first FM radio transmitter 104, via a first FM radio channel. The FM signal 701 may include a broadcast data signal that may include a plurality of data packets. The broadcast data signal may include audio segment of a aural information of the performer-of-interest 118. For example, the aural information of the performer-of-interest 118 may be a song sung by a singer in the live concert. The broadcast data signal may further include, the text information associated with the audio segment, and the synchronization information. The text information associated with the audio segment may be lyrics information (or other words that do not form part of lyrics information) for the audio segment (e.g. a song). The synchronization information may be associated with the text information and the audio segment. The synchronization information may be the timing information associated with the audio segment. The circuitry 202 may be further configured to extract the plurality of data packets from the broadcast data signal of the FM signal 701. For example, the circuitry 202 may be further configured to extract the synchronization information from the extracted plurality of data packets of the broadcast data signal. A portion of the text information may also be extracted based on the extracted synchronization information from the broadcast data signal. The circuitry 202 may be further configured to control display of the extracted portion of the text information on a display screen, such as the display screen 706 of the head-mounted device 702. The extracted portion of the text information may be displayed based on the timing information as well as the captured image of the first scene 704.

For unobstructed and uncluttered presentation of the extracted portion of the text information, the circuitry 202 may be configured to determine the first plurality of visually relevant areas 710A to 710E in the captured image (or video) of the first scene 704. The circuitry 202 may determine the first plurality of visually relevant areas 710A to 710E in the captured image of the first scene 704 based on a position of the plurality of objects 708A to 708F in the captured image of the first scene 704. Each visually relevant area of the first plurality of visually relevant areas 710A to 710E may be an area in the captured image that includes each object of the plurality of objects 708A to 708F. For example, a first visually relevant area 710A may include the drum 708D and the drummer 708E of the captured image of the first scene 704 of the live concert. Similarly, a second visually relevant area 710B may include the performer-of-interest 118 (for example, the singer at the live concert), the microphone 708A, and the microphone stand 708B of the captured image of the first scene 704 of the live concert. A third visually relevant area 710C may include the piano 708C of the captured image of the first scene 704 of the live concert. A fourth visually relevant area 710D may include a first light of the plurality of lights 708F and a fifth visually relevant area 710E may include a second light of the plurality of lights 708F of the captured image of the first scene 704 of the live concert.

The circuitry 202 may be further configured to determine the first plurality of visually non-relevant areas 712A to 712C in the captured image of the first scene 704 of the live concert. The circuitry 202 may determine the first plurality of visually non-relevant areas 712A to 712C based on the blank area or spacing among the position of the plurality of objects 708A to 708F in the captured image of the first scene 704 of the live concert. Each visually non-relevant area of the first plurality of visually non-relevant areas 712A to 712C may be an area in the captured image of the first scene 704 where the plurality of objects 708A to 708F are not present. Alternatively stated, each visually non-relevant area of the first plurality of visually non-relevant areas 712A to 712C may be an area that if overlaid with the extracted portion of the text information, may not hinder the view of the performer-of-interest 118 or other objects in the first plurality of visually relevant areas 710A to 710E. The circuitry 202 may further be configured to select a first visually non-relevant area 712A of the first plurality of visually non-relevant areas 712A to 712C for the display of the portion of the text information, such as the first text 714. The portion of the text information (e.g., lyrics information), such as the first text 714, may be associated with the portion of the audio segment (e.g., a portion of a song) of the aural information of the performer-of-interest 118 (e.g., a singer in a live concert) during the live concert.

The circuitry 202 may be further configured to compare a size of each visually non-relevant area of the first plurality of visually non-relevant areas 712A to 712C. The circuitry 202 may be configured to select the first visually non-relevant area 712A of the first plurality of visually non-relevant areas 712A to 712C for the display of the first text on the display screen 706 of the head-mounted device 702, based on a comparison of a size of each visually non-relevant area of the first plurality of visually non-relevant areas 712A to 712C. The size of the first visually non-relevant area 712A may be maximum as compared to the size of a second visually non-relevant area 712B and a third visually non-relevant area 712C of the first plurality of visually non-relevant areas 712A to 712C. Alternatively stated, the circuitry 202 may be configured to select that visually non-relevant area with the maximum size as compared to each visually non-relevant area of the first plurality of visually non-relevant areas 712A to 712C. The first text 714 associated with the portion of the audio segment of the aural information of performer-of-interest 118 may be extracted from a FM signal (such as the first FM signal 108) as shown and described in FIGS. 1, 2, 3A, 3B, 4, 5.

The circuitry 202 may be further configured to control display of the first text 714 at a first position in the first visually non-relevant area 712A, such that, the first text 714 does not obstruct a view of the plurality of objects 708A to 708F in the first plurality of visually relevant areas 710A to 710E. The maximum size of the first visually non-relevant area 712A may be utilized by the circuitry 202 to display the first text 714 clearly without obstructing the view of the plurality of objects 708A to 708F of the first scene 704. The circuitry 202 may also determine the first display characteristic and the second display characteristic of the first text 714 displayed in the first visually non-relevant area 712A based on the size of the first visually non-relevant area 712A (as shown and described for example in FIGS. 6A and 6B).

The user 114 (or spectator) may wear the head-mounted device 702 to view the first scene 704 of the live concert through a see-through display screen, such as the display screen 706. The user 114 may be able to view the plurality of objects 708A to 708F through the display screen 706. The first text 714 may be displayed at the first position on the display screen 706 that lies in the first visually non-relevant area 712A of the captured image of the first scene 704. For example, as shown in FIG. 7A, the first text 714, such as "Hymn for the" is displayed in the first visually non-relevant area 712A on the display screen 706 when viewed by the user 114.

With reference to FIG. 7B, there is shown the head-mounted device 702, a second scene 716, the display screen 706 of the head-mounted device 702, the user 114, the performer-of-interest 118, the plurality of objects 708A to 708F, a second plurality of visually relevant areas 718A to 710E, a second plurality of visually non-relevant areas 720A to 720C and the first text 714.

In accordance with an embodiment, the circuitry 202 may be further configured to detect a change on position of one or more of the plurality of objects 708A to 708F in the first scene 704 to a different position(s) in a second scene 716 in the LOS of the user 114 wearing the head-mounted device 702. As shown in FIG. 7B the position of the performer-of-interest 118 and the microphone 708A changes in the second scene 716. For example, the performer-of-interest 118 (e.g., the singer in the live concert), may have taken the microphone 708A in hand and changed the position while performing at the live concert.

The circuitry 202 may be further configured to re-determine and update the first plurality of visually relevant areas 710A to 710E and the first plurality of visually non-relevant areas 712A to 712C previously determined for the first scene 704. The circuitry 202 may be further configured to determine the second plurality of visually relevant areas 718A to 718E in the captured view (e.g. an image or a video) of the second scene 716 in the LOS of the user 114 wearing the head-mounted device 702. The circuitry 202 may determine the second plurality of visually relevant areas 718A to 718E based on the positions of the plurality of objects 708A to 708F in the captured view of the second scene 716. For example, as shown in FIG. 7B, a first visually relevant area 718A of the second plurality of visually relevant areas 718A to 718E may include the drum 708D and the drummer 708E of the captured image of the second scene 716 of the live concert. Similarly, a second visually relevant area 718B may include the performer-of-interest 118 (for example, the singer at the live concert), the microphone 708A, and the microphone stand 708B in the captured view of the second scene 716 of the live concert. Similarly, a third visually relevant area 718C of the second plurality of visually relevant areas 718A to 718E may include the piano 708C in the captured view of the second scene 716 of the live concert. A fourth visually relevant area 718D may include a first light of the plurality of lights 708F and a fifth visually relevant area 718E may include a second light of the plurality of lights 708F in the captured view of the second scene 716 of the live concert.

The circuitry 202 may be further configured to determine the second plurality of visually non-relevant areas 720A to 720C in the captured view of the second scene 716 of the live concert, based on the change in positions of the plurality of objects 708A to 708F. For example, the position of the performer-of-interest 118 (e.g., the singer of the live concert) and the microphone 708A changes from the first scene 704 to the second scene 716, as shown in FIG. 7B. The circuitry 202 may be further configured to compare a size of each visually non-relevant area of the second plurality of visually non-relevant areas 720A to 720C.

The circuitry 202 may be further configured to select the first visually non-relevant area 720A of the second plurality of visually non-relevant areas 720A to 720C for display of the portion of the text information, such as the first text 714. The size of the first visually non-relevant area 720A may be maximum as compared to the size of other visually non-relevant areas of the second plurality of visually non-relevant areas 720A to 720C. The circuitry 202 may be further configured to control display of the first text 714 at a first position in the first visually non-relevant area 720A such that an uncluttered and unobstructed view of the second scene 716 of the live concert is provided In an exemplary embodiment, as shown in FIG. 7B, the first text 714, such as "Hymn for the" is displayed in the first visually non-relevant area 712A on the display screen 706 when viewed by the user 114, such that the first text 714 does not obstruct the view of the plurality of objects 708A to 708F to the user 114.

Figure 8:
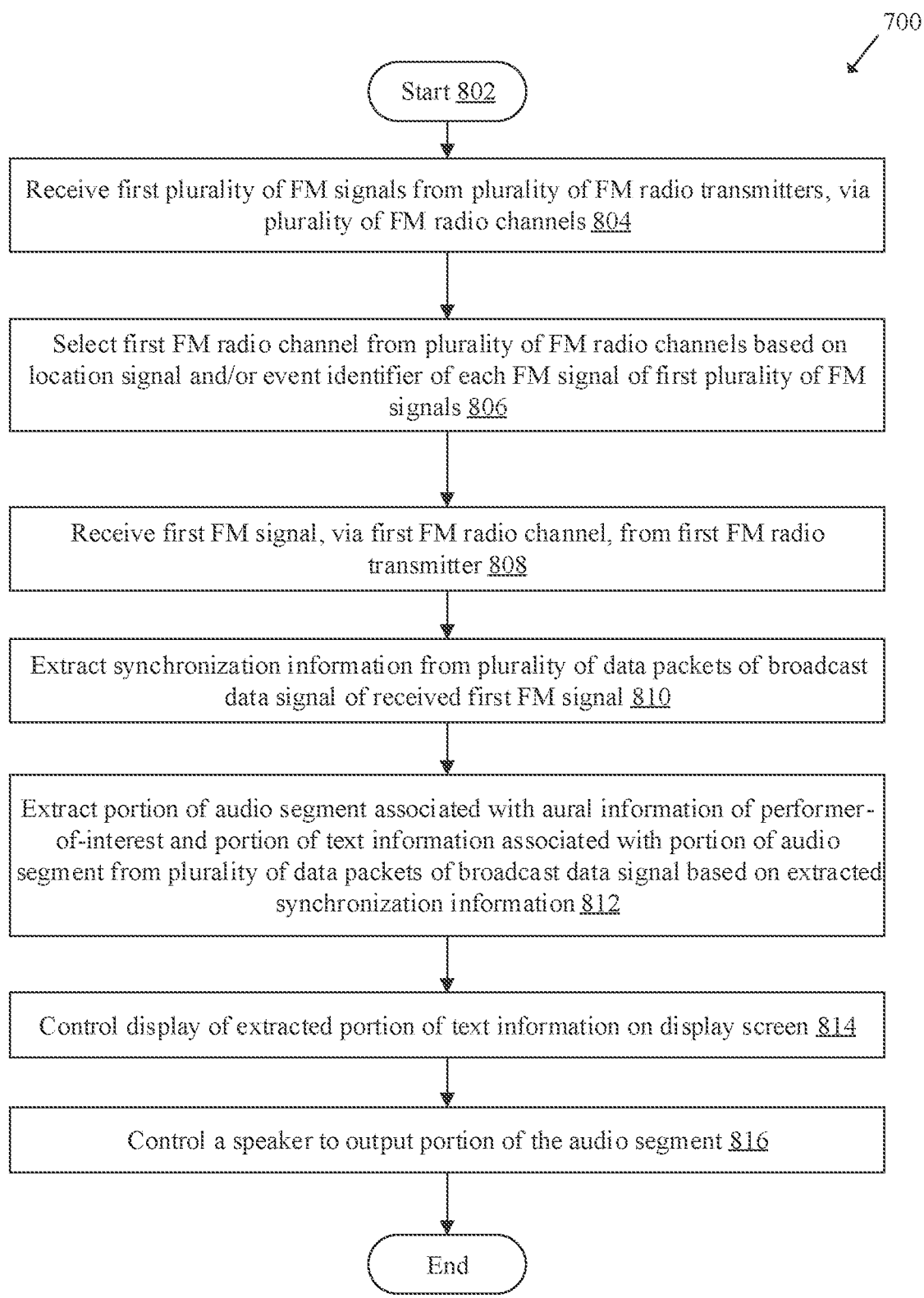
FIG. 8 is a flowchart that illustrates exemplary operations for textual display of aural information broadcast via FM signals, in accordance with an embodiment of the disclosure.

FIG. 8 depicts a flowchart that illustrates exemplary operations for textual display of aural information broadcast via FM signals, in accordance with an embodiment of the disclosure. With reference to FIG. 8, there is shown a flowchart 800. The flowchart 800 is described in conjunction with FIGS. 1, 2, 3A, 3B, 4, 5, 6A, 6B, 7A and 7B. The operations from 804 to 816 may be implemented in the electronic device 102. The operations of the flowchart 800 may start at 802 and proceed to 804.

At 804, the first plurality of FM signals may be received from the plurality of FM radio transmitters, via a plurality of FM radio channels. The plurality of FM radio transmitters may include the first FM radio transmitter 104. The FM receiver 204 may be configured to receive the first plurality of FM signals. Each FM signal of the first plurality of FM signals may include the location signal that comprises information associated with the geo-location of each FM radio transmitter of the plurality of FM radio transmitters. Each FM signal of the first plurality of FM signals may include the event identifier that corresponds to identification information of a plurality of events. The reception of the first plurality of signals from the plurality of FM radio transmitters is shown and described, for example, in FIG. 5.

At 806, the first FM radio channel from the plurality of FM radio channels may be selected based on the location signal and/or the event identifier of each FM signal of the first plurality of FM signals. The circuitry 202 may be configured to select the first FM radio channel from the plurality of FM radio channels, based on the location signal and/or the event identifier of each FM signal of the first plurality of FM signals. The circuitry 202 may be configured to select the first FM radio channel, based on the comparison of the geo-location of the first FM radio transmitter 104 with the geo-location of the electronic device 102. In some embodiments, the circuitry 202 may be configured to select the first FM radio channel based on the comparison of the event identifier of the first FM signal 108 with the default event identifier.

At 808, the first FM signal 108 may be received, via the first FM radio channel, from the first FM radio transmitter 104. The FM receiver 204 may be configured to receive the first FM signal 108 from the first FM radio transmitter 104, via the first FM radio channel. The first FM signal 108 may include the broadcast data signal (such as the broadcast data signal 302, in FIG. 3A) that includes a plurality of data packets. The broadcast data signal of the first FM signal 108 may include the audio segment of the live event, text information associated with the audio segment, and synchronization information. For example, the audio segment may be a song performed by the performer-of-interest 118 at the live event and, the text information associated with the audio segment may be the lyrics of the song. The synchronization information may be associated with the text information and the audio segment.

At 810, the synchronization information may be extracted from the plurality of data packets of the broadcast data signal of the received first FM signal 108. The circuitry 202 may be configured to extract the plurality of data packets of the broadcast data signal. The circuitry 202 may be further configured to extract the synchronization information from the extracted plurality of data packets of the broadcast data signal. The synchronization information may be the timing information associated with the audio segment.

At 812, the portion of the audio segment associated with the aural information of the performer-of-interest 118 and the portion of the text information associated with the portion of the audio segment may be extracted from the extracted plurality of data packets of the broadcast data signal based on the extracted synchronization information. The circuitry 202 may be configured to extract the portion of the audio segment associated with the aural information of the performer-of-interest 118 and the portion of the text information from the extracted plurality of data packets. For example, the portion of the audio segment may be a portion of a song sung by the performer-of-interest 118 (e.g., a singer) in a live concert. The portion of the text information may be the lyrics of the portion of the audio segment.

At 814, the display of the extracted portion of the text information may be controlled on the display screen 110. The circuitry 202 may be configured to control the display of the extracted portion of the text information on the display screen 110, based on the synchronization information. The displayed portion of the text information may be synchronized with the portion of the audio segment that may be enunciated by the performer-of-interest 118 during the live event. The display of the extracted portion of the text information may be further controlled based on display characteristic of the portion of the text information, a size of the display screen 110, an aspect ratio of the display screen 110, or a total number of characters in the portion of the text information and captured view of a scene (e.g. the visually relevant and non-relevant areas determined in the captured view of the first scene 704 and the second scene 716 (FIGS. 7A and 7B).

At 816, the speaker 112 may be controlled to output the portion of the audio segment. The circuitry 202 may be configured to extract the portion of the audio segment from the extracted plurality of data packets of the broadcast data signal. The circuitry 202 may be configured to control a speaker, such as the speaker 112 to output the extracted portion of the audio segment, based on the synchronization information. The output of the portion of the audio segment, via the speaker 112, may be in synchronization with the display of the portion of the text information on the display screen 110. The control may pass to end.

Exemplary aspects of the disclosure may include an electronic device (such as the electronic device 102) that includes a display screen (such as the display screen 110) and a circuitry (such as the circuitry 202). The circuitry 202 may be configured to receive, via a first FM radio channel, a first FM signal (such as the first FM signal 108) from a first FM radio transmitter (such as the first FM radio transmitter 104). The first FM signal may comprise a broadcast data signal (such as the broadcast data signal 302) that comprises an audio segment of aural information of a performer-of-interest (such as the performer-of-interest 118) at of a live event, text information associated with the audio segment, and synchronization information. The synchronization information may be associated with the text information and the audio segment. The circuitry 202 may be further configured to extract a plurality of data packets from the broadcast data signal. The circuitry 202 may be configured to extract the synchronization information from the extracted plurality of data packets of the broadcast data signal. The circuitry 202 may be configured to extract a portion of the text information from the extracted plurality of data packets of the broadcast data signal based on the extracted synchronization information. The circuitry 202 may be further configured to control display of the extracted portion of the text information on the display screen.

In accordance with an embodiment, the electronic device 102 may further include a speaker (such as the speaker 112). The circuitry 202 may be configured to extract a portion of the audio segment from the extracted plurality of data packets of the broadcast data signal. The circuitry 202 may be configured to control the speaker to output the extracted portion of the audio segment. The circuitry 202 may be further configured to receive via a plurality of FM radio channels, a first plurality of FM signals from a plurality of FM radio transmitters which include the first FM radio transmitter. Each FM signal of the first plurality of FM signals may comprise a location signal that comprises information associated with a geo-location of each FM radio transmitter of the plurality of FM radio transmitters. The circuitry 202 may be configured to select the first FM radio channel from the plurality of FM radio channels, based on the location signal of each FM signal of the first plurality of FM signals. In accordance with an embodiment, each FM signal of the first plurality of FM signals may comprise an event identifier. The circuitry 202 may be further configured to select the first FM radio channel from the plurality of FM radio channels, based on the event identifier of each FM signal of the first plurality of FM signals. The event identifier in the first FM signal may correspond to identification information of the live event.

In accordance with an embodiment, the circuitry 202 may be configured to receive, via the first FM radio channel, a second plurality of FM signals from a plurality of FM radio transmitters which include the first FM radio transmitter. Each FM signal of the second plurality of FM signals may comprise a location signal that comprises information associated with a geo-location of each FM radio transmitter of the plurality of FM radio transmitters. The circuitry 202 may be configured to filter a plurality of unwanted FM signals from the second plurality of FM signals to obtain the first FM signal. The circuitry 202 may be configured to filter the plurality of unwanted FM signals based on a comparison of a geo-location of the electronic device with the geo-location of each FM radio transmitter of the plurality of FM radio transmitters. In accordance with an embodiment, each FM signal of the second plurality of FM signals may comprise an event identifier. The circuitry 202 may be configured to filter the first FM signal from the second plurality of FM signals based on a comparison of the event identifier of each FM signal of the second plurality of FM signals with a user-specified event identifier.

In accordance with an embodiment, the synchronization information may be associated with the text information that corresponds to timing information associated with the audio segment. The circuitry 202 may be further configured to control display of the extracted portion of the text information on the display screen based on the timing information. In accordance with an embodiment, the circuitry 202 may be configured to determine a first display characteristic of the portion of the text information. The first display characteristic may be determined based on at least one of a size of the display screen, an aspect ratio of the display screen, or a total number of characters in the portion of the text information. The first display characteristic of the portion of the text information may be a combination of a first plurality of display parameters. The first plurality of display parameters may include a font size, a font style, and a number of characters in the portion of the text information to be displayed on the display screen. In accordance with an embodiment, the circuitry 202 may be further configured to determine a second display characteristic of the portion of the text information, based on a background color of the display screen. The second display characteristic of the portion of the text information may be a combination of a second plurality of display parameters. The second plurality of display parameters may include a font color, a brightness value, a contrast value, and a sharpness value.

In accordance with an embodiment, the electronic device 102 may further include an image capture device (such as the image capture device 208) configured to capture an image of a first scene in a line-of-sight (LOS) of a user (such as the user 114). The circuitry 202 may be further configured to determine a plurality of visually relevant areas and a plurality of visually non-relevant areas in the captured image, based on a position of a plurality of objects in the captured image. The plurality of objects of the captured image may be present in the plurality of visually relevant areas and the plurality of objects of the captured image may be absent in the plurality of visually non-relevant areas. The circuitry 202 may be further configured to control display of the extracted text information at a first position in a first visually non-relevant area, based on a comparison of a size of each visually non-relevant area of the plurality of visually non-relevant areas. A size of the first visually non-relevant area for the display of the text information may be maximum among the size of each visually non-relevant area of the plurality of visually non-relevant areas.

Various embodiments of the disclosure may provide a non-transitory, computer-readable medium and/or storage medium, and/or a non-transitory machine readable medium and/or storage medium stored thereon, a set of instructions executable by a machine and/or a computer that comprises one or more circuits. The set of instructions may be executable by the machine and/or the computer to perform the steps that may comprise receiving, via a first FM radio channel, a first FM signal from a first FM radio transmitter. The first FM signal may comprise a broadcast data signal that comprises an audio segment of aural information of a performer-of-interest at of a live event, text information associated with the audio segment, and synchronization information. The synchronization information may be associated with the text information and the audio segment. A plurality of data packets may be extracted from the broadcast data signal. The synchronization information may be extracted from the extracted plurality of data packets of the broadcast data signal. A portion of the text information may be extracted from the extracted plurality of data packets of the broadcast data signal based on the extracted synchronization information. A display of the extracted portion of the text information may be controlled on the display screen.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims

What is claimed is:

1. An electronic device, comprising:
a display screen; and
circuitry, coupled to the display screen, wherein the circuitry is configured to:
receive, via a first frequency modulated (FM) radio channel, a first FM signal from a first FM radio transmitter,
wherein the first FM signal comprises a broadcast data signal that comprises an audio segment of aural information of a performer-of-interest at a live event, text information associated with the audio segment, and synchronization information, and
the synchronization information is associated with the text information and the audio segment;
extract a plurality of data packets from the broadcast data signal;
extract the synchronization information from the extracted plurality of data packets of the broadcast data signal;
extract a portion of the text information from the extracted plurality of data packets of the broadcast data signal based on the extracted synchronization information; and
control display of the extracted portion of the text information on the display screen.

2. The electronic device accordingly to claim 1, further comprising:
a speaker,
wherein the circuitry is further configured to:
extract a portion of the audio segment from the extracted plurality of data packets of the broadcast data signal; and
control the speaker to output the extracted portion of the audio segment.

3. The electronic device according to claim 1, wherein the circuitry is further configured to receive, via a plurality of FM radio channels, a first plurality of FM signals from a plurality of FM radio transmitters which include the first FM radio transmitter.

4. The electronic device according to claim 3, wherein each FM signal of the first plurality of FM signals comprises a location signal that comprises information associated with a geo-location of each FM radio transmitter of the plurality of FM radio transmitters.

5. The electronic device according to claim 4, wherein the circuitry is further configured to select the first FM radio channel from the plurality of FM radio channels, based on the location signal of each FM signal of the first plurality of FM signals.

6. The electronic device according to claim 3, wherein
each FM signal of the first plurality of FM signals comprises an event identifier, and
the circuitry is further configured to select the first FM radio channel from the plurality of FM radio channels, based on the event identifier of each FM signal of the first plurality of FM signals.

7. The electronic device according to claim 6, wherein the event identifier in the first FM signal corresponds to identification information of the live event.

8. The electronic device according to claim 1, wherein the circuitry is further configured to receive, via the first FM radio channel, a second plurality of FM signals from a plurality of FM radio transmitters which include the first FM radio transmitter.

9. The electronic device according to claim 8, wherein each FM signal of the second plurality of FM signals comprises a location signal that comprises information associated with a geo-location of each FM radio transmitter of the plurality of FM radio transmitters.

10. The electronic device according to claim 9, wherein the circuitry is further configured to filter a plurality of unwanted FM signals from the second plurality of FM signals to obtain the first FM signal, based on a comparison of a geo-location of the electronic device with the geo-location of each FM radio transmitter of the plurality of FM radio transmitters.

11. The electronic device according to claim 8, wherein
each FM signal of the second plurality of FM signals comprises an event identifier, and
the circuitry is further configured to filter the first FM signal from the second plurality of FM signals based on a comparison of the event identifier of each FM signal of the second plurality of FM signals with a user-specified event identifier.

12. The electronic device according to claim 1, wherein
the synchronization information associated with the text information corresponds to timing information associated with the audio segment, and
the circuitry is further configured to control display of the extracted portion of the text information on the display screen based on the timing information.

13. The electronic device according to claim 1, wherein the circuitry is further configured to determine a first display characteristic of the portion of the text information, based on at least one of a size of the display screen, an aspect ratio of the display screen, or a total number of characters in the portion of the text information.

14. The electronic device according to claim 13, wherein
the first display characteristic of the portion of the text information is a combination of a first plurality of display parameters,
the first plurality of display parameters include a font size, a font style, and a number of characters in the portion of the text information to be displayed on the display screen.

15. The electronic device according to claim 1, wherein the circuitry is further configured to determine a second display characteristic of the portion of the text information, based on a background color of the display screen.

16. The electronic device according to claim 15, wherein
the second display characteristic of the portion of the text information is a combination of a second plurality of display parameters,
the second plurality of display parameters include a font color, a brightness value, a contrast value, and a sharpness value.

17. The electronic device according to claim 1, further comprising an image capture device configured to capture a view of a first scene in a line-of-sight (LOS) of a user,
the circuitry is further configured to determine a plurality of visually relevant areas and a plurality of visually non-relevant areas in the captured view, based on a position of a plurality of objects in the captured view, and
the plurality of objects are present in the plurality of visually relevant areas in the captured view and the plurality of objects are absent in the plurality of visually non-relevant areas in the captured view.

18. The electronic device according to claim 17, wherein the circuitry is further configured to control display of the text information at a first position in a first visually non-relevant area, based on a comparison of a size of each visually non-relevant area of the plurality of visually non-relevant areas,
a size of the first visually non-relevant area for the display of the text information is maximum among the size of each visually non-relevant area of the plurality of visually non-relevant areas.

19. A method, comprising:
in an electronic device:
receiving via a first frequency modulated (FM) radio channel, a first FM signal from a first FM radio transmitter,
the first FM signal comprises a broadcast data signal that comprises an audio segment of aural information of a performer-of-interest at a live event, text information associated with the audio segment, and synchronization information, and
the synchronization information is associated with the text information and the audio segment;
extracting a plurality of data packets from the broadcast data signal;
extracting the synchronization information from the extracted plurality of data packets of the broadcast data signal;
extracting a portion of the text information from the extracted plurality of data packets of the broadcast data signal based on the extracted synchronization information; and
controlling display of the extracted portion of the text information on a display screen.

20. The method according to claim 19, further comprising, receiving via a plurality of FM radio channels, a first plurality of FM signals from a plurality of FM radio transmitters which include the first FM radio transmitter.

21. The method according to claim 20, wherein each FM signal of the first plurality of FM signals comprises a location signal that comprises information associated with a geo-location of each FM radio transmitter of the plurality of FM radio transmitters.

22. The method according to claim 21, further comprising selecting the first FM radio channel from the plurality of FM radio channels, based on the location signal of each FM signal of the first plurality of FM signals.

23. A non-transitory computer-readable medium having stored thereon, computer-executable instructions which, when executed by an electronic device, cause the electronic device to execute operations, the operations comprising:
receiving via a first frequency modulated (FM) radio channel, a first FM signal from a first FM radio transmitter,
the first FM signal comprises a broadcast data signal that comprises an audio segment of aural information of a performer-of-interest at a live event, text information associated with the audio segment, and synchronization information, and
the synchronization information is associated with the text information and the audio segment;
extracting a plurality of data packets from the broadcast data signal;
extracting the synchronization information from the extracted plurality of data packets of the broadcast data signal;
extracting a portion of the text information from the extracted plurality of data packets of the broadcast data signal based on the extracted synchronization information; and
controlling display of the extracted portion of the text information on a display screen.

\* \* \* \* \*